United States Patent [19]
Rickards et al.

[11] Patent Number: 6,059,034
[45] Date of Patent: May 9, 2000

[54] FORMATION TREATMENT METHOD USING DEFORMABLE PARTICLES

[75] Inventors: Allan R. Rickards, Pinehurst; Harold D. Brannon, Spring, both of Tex.; Philip J. Rae, Singapore, Singapore; Gino A. DiLullo, Caracus, Venezuela; Christopher J. Stephenson, Houston, Tex.

[73] Assignee: BJ Services Company, Houston, Tex.

[21] Appl. No.: 09/085,416

[22] Filed: May 27, 1998

Related U.S. Application Data

[63] Continuation-in-part of application No. 08/756,414, Nov. 27, 1996, abandoned.

[30] Foreign Application Priority Data

Nov. 21, 1997 [DK] Denmark ................................. 1333/97

[51] Int. Cl.$^7$ .................................................. E21B 43/26
[52] U.S. Cl. ........................................... 166/280; 166/310
[58] Field of Search .................................. 166/280, 276, 166/278, 295, 308, 310

[56] References Cited

U.S. PATENT DOCUMENTS

| | | | |
|---|---|---|---|
| 3,089,542 | 5/1963 | Kolodny | 166/42 |
| 3,155,159 | 11/1964 | McGuire et al. | 166/29 |
| 3,254,064 | 5/1966 | Nevins | 260/87.7 |
| 3,363,690 | 1/1968 | Fischer | 166/33 |
| 3,387,888 | 6/1968 | Shock et al. | 299/4 |
| 3,481,401 | 12/1969 | Graham . | |
| 3,659,651 | 5/1972 | Graham | 166/280 |
| 3,677,941 | 7/1972 | Mazzara et al. | 252/8.55 R |
| 3,888,311 | 6/1975 | Cooke, Jr. . | |
| 3,917,345 | 11/1975 | Davidson et al. | 299/5 |
| 3,929,191 | 12/1975 | Graham et al. | 166/276 |
| 3,998,744 | 12/1976 | Arnold et al. | 252/8.55 R |
| 4,049,866 | 9/1977 | Lane et al. | 428/402 |
| 4,518,039 | 5/1985 | Graham et al. | 166/276 |
| 4,527,627 | 7/1985 | Graham et al. . | |
| 4,664,619 | 5/1987 | Johnson et al. | 431/154 |
| 4,664,819 | 5/1987 | Glaze et al. | 252/8.551 |
| 4,779,680 | 10/1988 | Sydansk | 166/300 |
| 4,869,960 | 9/1989 | Gibb et al. | 428/405 |
| 4,969,523 | 11/1990 | Martin et al. | 166/278 |
| 5,251,697 | 10/1993 | Shuler | 166/268 |
| 5,330,005 | 7/1994 | Card et al. | 166/280 |
| 5,381,864 | 1/1995 | Nguyen et al. | 166/280 |
| 5,422,183 | 6/1995 | Sinclair et al. | 428/403 |
| 5,439,055 | 8/1995 | Card et al. | 166/280 |
| 5,492,178 | 2/1996 | Nguyen et al. | 166/276 |
| 5,501,274 | 3/1996 | Nguyen et al. | 166/276 |
| 5,501,275 | 3/1996 | Card et al. | 166/280 |
| 5,531,274 | 7/1996 | Bienvenu, Jr. | 166/280 |
| 5,582,249 | 12/1996 | Caveny et al. | 166/276 |

FOREIGN PATENT DOCUMENTS

| | | |
|---|---|---|
| 0 771 935 A1 | 7/1997 | European Pat. Off. . |
| WO 96/04464 | 2/1996 | WIPO . |

OTHER PUBLICATIONS

International Search Report dated Oct. 13, 1998 (PCT/US98/10735)(BJSC:245P).
Foreign Search Report, Mar. 3, 1998.
Co–pending U. S. application SN 08/756,414 filed Nov. 27, 1996 (BJSC:201).

*Primary Examiner*—Frank Tsay
*Attorney, Agent, or Firm*—O'Keefe, Egan & Peterman

[57] ABSTRACT

A subterranean formation is treated by injecting a blend of fracture proppant material and deformable particulate material into the formation. The deformable particulate material may combine with the fracture proppant material to increase fracture conductivity, reduce fines generation, and/or reduce proppant flowback. The fracture proppant material may be a material such as sand, and the deformable particulate material may be a material such as polystyrene divinylbenzene beads.

105 Claims, 25 Drawing Sheets

Proppant Particle with Deformable Coat

Agglomerate Particle with Coat
to Fill Pore Spaces

6,059,034

FORMATION TREATMENT METHOD USING DEFORMABLE PARTICLES

The present application claims priority on of U.S. patent application Ser. No. 08/756,414 filed Nov. 27, 1996, now abandoned, and a continuation-in-part Danish patent application S/N 1333/97 filed Nov. 21, 1997. The entire text of each of the above-referenced disclosures is specifically incorporated by reference herein without disclaimer.

BACKGROUND OF THE INVENTION

1. Field of the Invention

This invention relates generally to subterranean formation treatments and, more specifically, to hydraulic fracturing treatments for subterranean formations. In particular, this invention relates to deformable particles mixed with fracturing proppants to reduce fines generation, improve fracture conductivity, and/or minimize proppant flowback.

2. Description of the Related Art

Hydraulic fracturing is a common stimulation technique used to enhance production of fluids from subterranean formations. In a typical hydraulic fracturing treatment, fracturing treatment fluid containing a solid proppant material is injected into the formation at a pressure sufficiently high enough to cause the formation or enlargement of fractures in the reservoir. During a typical fracturing treatment, proppant material is deposited in a fracture, where it remains after the treatment is completed. After deposition, the proppant material serves to hold the fracture open, thereby enhancing the ability of fluids to migrate from the formation to the well bore through the fracture. Because fractured well productivity depends on the ability of a fracture to conduct fluids from a formation to a wellbore, fracture conductivity is an important parameter in determining the degree of success of a hydraulic fracturing treatment.

One problem related to hydraulic fracturing treatments is the creation of reservoir "fines" and associated reduction in fracture conductivity. These fines may be produced when proppant materials are subjected to reservoir closure stresses within a formation fracture which cause proppant materials to be compressed together in such a way that small particles ("fines") are generated from the proppant material and/or reservoir matrix. In some cases, production of fines may be exacerbated during production/workover operations when a well is shut-in and then opened up. This phenomenon is known as "stress cycling" and is believed to result from increased differential pressure and closure stress that occurs during fluid production following a shut-in period. Production of fines is undesirable because of particulate production problems, and because of reduction in reservoir permeability due to plugging of pore throats in the reservoir matrix.

Production of particulate solids with subterranean formation fluids is also a common problem. The source of these particulate solids may be unconsolidated material from the formation, proppant from a fracturing treatment and/or fines generated from crushed fracture proppant, as mentioned above. Production of solid proppant material is commonly known as "proppant flowback." In addition to causing increased wear on downhole and surface production equipment, the presence of particulate materials in production fluids may also lead to significant expense and production downtime associated with removing these materials from wellbores and/or production equipment. Accumulation of these materials in a well bore may also restrict or even prevent fluid production. In addition, loss of proppant due to proppant flowback may also reduce conductivity of a fracture pack.

In an effort to control or prevent production of formation or proppant materials, many methods have been developed. For example, to address proppant flowback methods utilizing special types of proppants and/or additives to proppants have been employed to help form a fracture pack in the reservoir which is resistant to proppant flowback. One well known method of this type utilizes resin-coated proppant materials designed to help form a consolidated and permeable fracture pack when placed in the formation. Among the ways this method may be carried out are by mixing a proppant particulate material with an epoxy resin system designed to harden once the material is placed in the formation, or by the use of a pre-coated proppant material which is pumped into the formation with the fracturing fluid and then consolidated with a curing solution pumped after the proppant material is in place. Although resin-coated proppant techniques may reduce proppant flowback, they may also suffer from various problems, including incompatibility of resins with cross-linker and breaker additives in the fracturing fluid, and long post-treatment shut-in times which may be economically undesirable. Resin-coated proppants may also be difficult to place uniformly within a fracture and may adversely affect fracture conductivity. In addition, resin-coated proppants are typically only added to the final stages of fracturing treatments due to their expense, resulting in a fracture pack that is consolidated only in a region near the well bore.

Recently, techniques employing a mixture of solid proppant materials designed to achieve proppant flowback control have been developed. In one technique, rod-like fibrous materials are mixed with proppant material for the purpose of causing particle bridging within a fracture proppant pack so as to inhibit particle movement and proppant flowback. This technique is believed to control proppant flowback by forming a "mat" of fibers across openings in the pack which tends to hold the proppant in place and limit proppant flowback during fluid production. However, in practice this method has proven to have several drawbacks, including reduction in fracture conductivity at effective concentrations of fibrous materials, and an effective life of only about two years due to slight solubility of commonly used fiber materials in brine. In addition, fiber proppant material used in the technique may be incompatible with some common well-treating acids, such as hydrofluoric acid.

In another recently developed method, thermoplastic material in the form of ribbons or flakes is mixed with proppant material in order to form a fracture proppant pack that is resistant to proppant flowback. The thermoplastic material is designed to intertwine with proppant particles and become "very tacky" at reservoir temperatures such as those greater than about 220° F. In doing so, the materials are believed to adhere to proppant material to form agglomerates that bridge against each other and help hold proppant materials in place. This method of controlling proppant flowback suffers similar drawbacks as the fiber proppant additive method described above, most notably reduced conductivity. Therefore, a method of reducing fines creation while at the same time improving fracture conductivity and reducing proppant flowback is desirable.

SUMMARY OF THE INVENTION

In one respect, this invention is a method of treating a subterranean formation by injecting into the formation a fracturing fluid composition that includes a blend of a fracture proppant material and a deformable beaded material.

In another respect, this invention is a method of treating a subterranean formation by injecting into the formation a blend of a fracture proppant material and a deformable particulate material. Individual particles of the deformable particulate material may have a shape with a maximum length-based aspect ratio of equal to or less than about 5.

In another respect, this invention is a method of treating a subterranean formation by injecting into the formation a blend of a fracture proppant material and a deformable particulate material having a shape that is at least one of beaded, cubic, bar-shaped, cylindrical, or a mixture thereof. Beaded or cylindrical shaped particulate materials may have a length to diameter aspect ratio of equal to or less than about 5, and bar-shaped particulate material may have a length to width aspect ratio of equal to or less than about 5 and a length to thickness aspect ratio of equal to or less than about 5.

In yet another respect, this invention is a method of treating a subterranean formation by injecting into the formation a fracturing fluid composition that includes a blend of fracture proppant material and deformable particulate material. In this method, the fracturing fluid composition is deposited in the subterranean formation so that the blend of fracture proppant material and deformable particulate material has an in situ conductivity greater than an in situ conductivity of either fracture proppant material or deformable particulate material alone.

In yet another respect, this invention is a method of treating a subterranean formation by injecting into the formation a fracturing fluid composition that includes a blend of fracture proppant material and deformable particulate material. In this method, the fracturing fluid composition is deposited in the subterranean formation so that the blend of fracture proppant material and deformable particulate material has an in situ creation of fines that is less than an in situ creation of fines in said fracture proppant material alone.

In yet another respect, this invention is a composition for fracturing a subterranean formation that includes a blend of a fracture proppant material and a deformable particulate material. The deformable particulate material may have a particle size of from about 4 mesh to about 100 mesh, a specific gravity of from about 0.4 to about 3.5, and a shape with a maximum length-based aspect ratio of equal to or less than about 5.

In yet another respect, this invention is a method of treating a subterranean formation, including the step of injecting a fracturing fluid composition into the subterranean formation, wherein the fracturing fluid composition includes a blend of a fracture proppant material and a deformable beaded material.

In yet another respect, this invention is a method of treating a subterranean formation, including the step of injecting a blend including a fracture proppant material and a deformable particulate material into a subterranean formation, wherein at least a portion of the individual particles of the deformable particulate have a shape with a maximum length-based aspect ratio of equal to or less than about 5. The blend may include between about 1% to about 50% by weight deformable particulate material. Furthermore, at least a portion of the individual particles of the deformable beaded material may include two or more components.

In yet another respect, this invention is a method of treating a subterranean formation, including the step of injecting a deformable particulate material into a subterranean formation, wherein at least a portion of the individual particles of the deformable particulate material include an agglomerate of substantially non-deformable material and substantially deformable material, a core of substantially non-deformable material surrounded by one layer of substantially deformable material, or a mixture thereof.

In yet another respect, this invention is a method of treating a subterranean formation, including the steps of injecting a fracturing fluid composition into the subterranean formation, wherein the fracturing fluid composition includes a blend of fracture proppant material and substantially deformable particulate material; and depositing the fracturing fluid composition in the subterranean formation, wherein an in situ conductivity of the blend of fracture proppant material and substantially deformable particulate material is greater than an in situ conductivity of either one of the fracture proppant material or substantially deformable particulate material alone; wherein at least a portion of the individual particles of the deformable particulate material include an agglomerate of substantially non-deformable material and substantially deformable material, a core of substantially non-deformable material surrounded by one layer of substantially deformable material, or a mixture thereof.

In yet another respect, this invention is a method of treating a subterranean formation, including the steps of injecting a fracturing fluid composition into the subterranean formation, wherein the fracturing fluid composition includes a blend of fracture proppant material and deformable particulate material; and depositing the fracturing fluid composition in the subterranean formation, wherein an in situ creation of fines in the blend of fracture proppant material and deformable particulate material is less than an in situ creation of fines in the fracture proppant material alone; wherein at least a portion of the individual particles of the deformable particulate material include an agglomerate of substantially non-deformable material and substantially deformable material, a core of substantially non-deformable material surrounded by one layer of substantially deformable material, or a mixture thereof.

In yet another respect, this invention is a composition for fracturing a subterranean formation, the composition including a deformable particulate material, wherein at least a portion of the individual particles of the deformable particulate material include a core of substantially non-deformable material surrounded by one layer of substantially deformable material.

In yet another respect, this invention is a composition for fracturing a subterranean formation, the composition including a blend of a fracture proppant material and a deformable particulate material, wherein the deformable particulate material has a maximum length-based aspect ratio of equal to or less than about 5.

In embodiments of the methods and compositions of this invention, deformable beaded material may have a Young's modulus of, for example, between about 500 psi and about 2,000,000 psi at in situ formation conditions, between about 5000 psi and about 200,000 psi at in situ formation conditions, or between about 7000 psi and about 150,000 psi at in situ formation conditions. Deformable beaded material may be a copolymer, such as a terpolymer, which may be at least one of polystyrene/vinyl/divinyl benzene, acrylate-based terpolymer or a mixture thereof. Deformable beaded material may also be polystyrene divinylbenzene that includes from about 4% to about 14% divinylbenzene by weight. At least a portion of the individual particles of the deformable beaded material may include two components such as, for example, a core of substantially non-deformable material surrounded by a layer of substantially deformable material. In this regard, the core may include a material selected from at least one of silica, ceramics, synthetic organic particles, glass microspheres, or a mixture thereof; and wherein the layer of substantially deformable material includes at least one of a cross-linked polymer, plastic, or a mixture thereof. Alternatively, the core may includes a material selected from at least one of silica, ceramics, synthetic organic particles, glass microspheres, or a mixture thereof; the layer of substantially deformable material may include resin and make up greater than 8% by weight of the total weight of the deformable beaded particle. A deformable particle may also be an agglomerate of substantially non-deformable material and substantially deformable material with the substantially deformable material making up between about 5% and about 50% by volume of the total volume of each of the individual particles of the deformable beaded material; and the substantially non-deformable material making up between about 50% and about 95% by volume of the total volume of each of the individual particles of the deformable beaded material.

DETAILED DESCRIPTION OF SPECIFIC EMBODIMENTS

In embodiments of the disclosed method, deformable particulate material (e.g., deformable particles) is added to and/or mixed with fracture proppant material to enhance conductivity and permeability of a fracture proppant pack, reduce fines generation, and/or minimize proppant flowback. By "deformable" it is meant that individual particles of a particulate material yield upon point to point stress with particles of fracture proppant material and/or deformable particulates present in a fracture pack. In connection with the disclosed method, the surprising discovery has been made that blends of fracture proppants and deformable particles according to embodiments of the disclosed method are synergistic in that combinations of fracture proppant material and deformable particles may possess greater conductivity and/or permeability than either material possesses alone. This synergistic effect is believed to result from a number of factors, including the in situ deformation of the deformable particles to form multi-planar structures or networks that, among other things, may cushion the fracture proppant material.

Surprisingly, it has also been found that combinations of deformable particles and fracture proppants according to embodiments of the disclosed method typically reduce fines generation as a result of closure stress applied on a proppant pack. In embodiments of the disclosed method, it is believed that deformable particulates act as a "cushion" to prevent grain to grain contact and absorb stress between particles of silica, synthetic or other types of proppants. It is believed that this cushion effect prevents proppant particles from shattering or breaking due to stress (including stress induced by stress cycling) and that therefore less fines are produced. When less fines are present to lower pore space in a proppant pack, porosity, permeability and/or conductivity may be maintained. As demonstrated in Example 5 and illustrated in FIG. 16, this reduction in fines generation allows the extension of the closure stress range in which fracture proppant materials, such as sand, may be used. This means that lower cost proppants such as sand may be utilized in those applications where more expensive high strength proppants have been traditionally employed.

Figure 1:
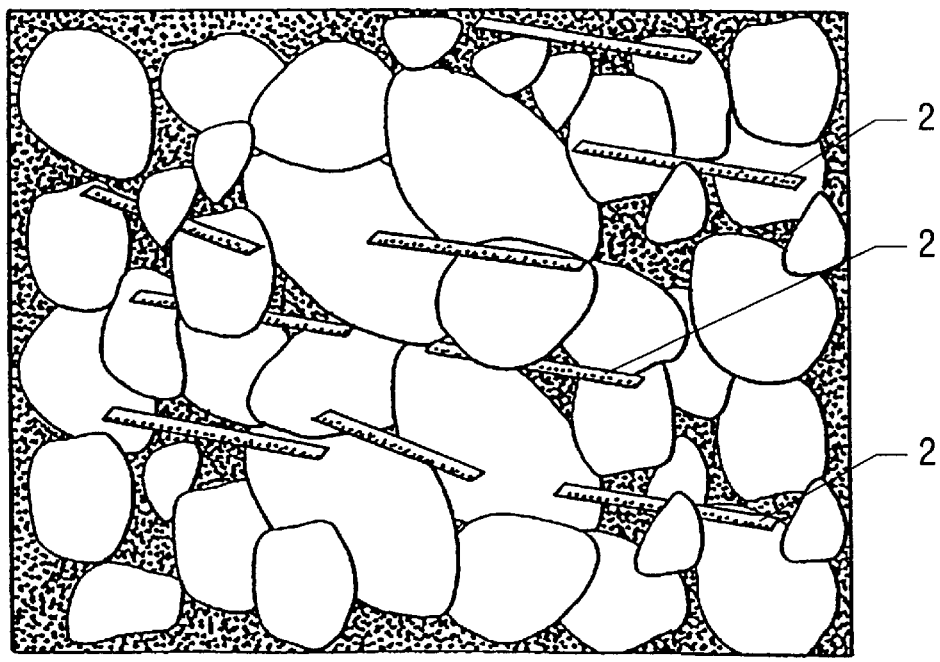
FIG. 1 is a representation of a uni-planar structural "mat" of fibers believed to form in situ using rod-like fibrous proppant additives of the prior art.
Figure 2:
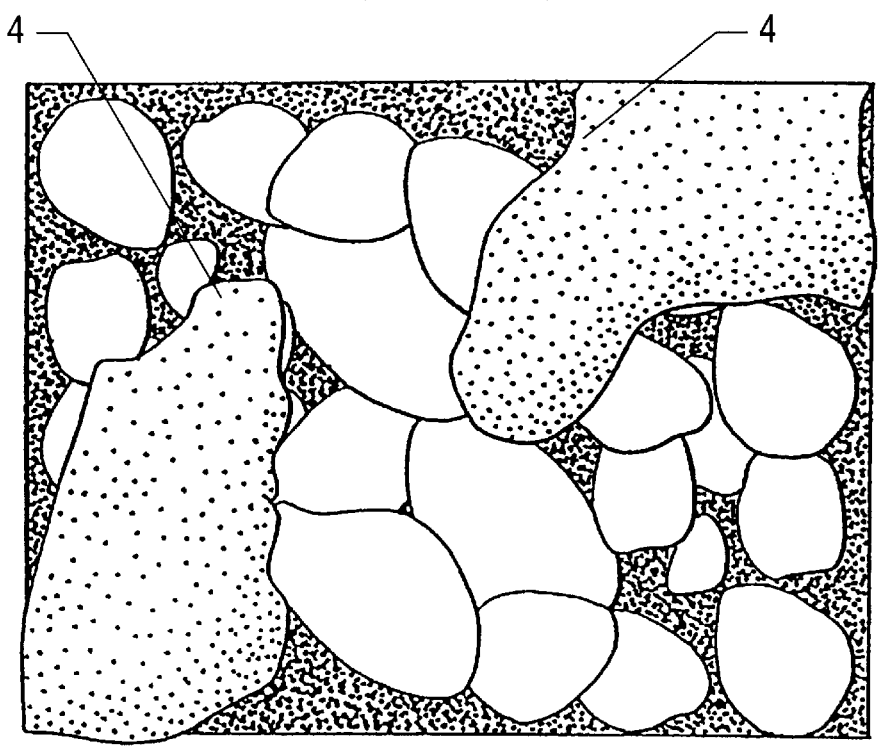
FIG. 2 is a representation of uni-planar agglomerate structures believed to form in situ using thermoplastic ribbon or flake proppant additives of the prior art.

As an additional benefit, it has been found that combinations of deformable particulate and proppant material according to embodiments of the disclosed method may also reduce proppant flowback due to plastic deformation of deformable particles into multi-planar structures. In the practice of the disclosed method, deformable particles deform at formation temperatures and with proppant contact as fracture closure stress is applied. Previous methods using fracturing treatment additive materials having fiber 2 or ribbon-like (or flake) 4 geometries, are believed to address proppant flowback by creating uni-planar structures with proppant as shown in FIGS. 1 and 2. By "uni-planar" it is meant that the in situ structures created by these additives are believed to have geometries that extend vector stress in one plane of a proppant pack. These structures are believed to exist as individual "mats" or agglomerates within a proppant pack. Unlike the previous methods and materials, embodiments of the disclosed method are believed to result in creation of multi-planar structures (or networks) in situ that act to reduce or prevent proppant flowback by increasing particle cohesion and proppant pack stability. By "multi-planar" it is meant that in situ structures created by the treatment additives of the disclosed method are believed to have geometries that extend vector stress in more than one plane of the proppant pack, i.e., in three dimensions. Therefore, structures formed in the practice of the disclosed method are believed to exist as in situ networks extending within, and forming part of, a fracture proppant matrix.

Particular embodiments of the disclosed method may offer further advantages. For example, when a substantially spherical deformable beaded material of the disclosed method is mixed with a relatively irregular or angular fracture proppant material such as sand, greater porosity and permeability may be achieved due to the creation of a pack geometry, such as hexagonal packing, that is superior to the pack geometry achieved by the fracture proppant material alone. In addition, even greater fracture conductivity may be achieved using the disclosed method by blending a fracture proppant material with a deformable material having a density less than that of the fracture proppant material, resulting in a greater fracture width per unit mass.

Figure 3:
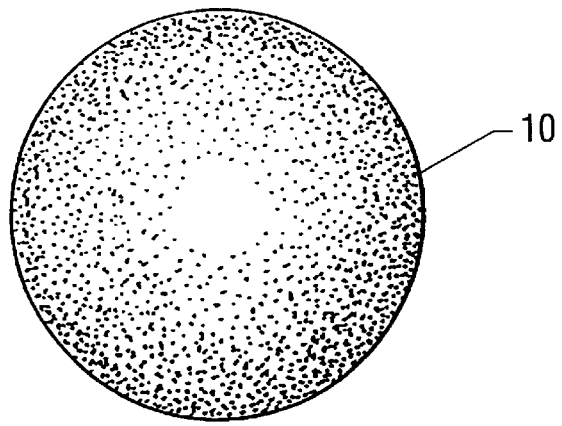
FIG. 3 is a representation of a substantially spherical deformable beaded particle according to one embodiment of the disclosed method.
Figure 4:
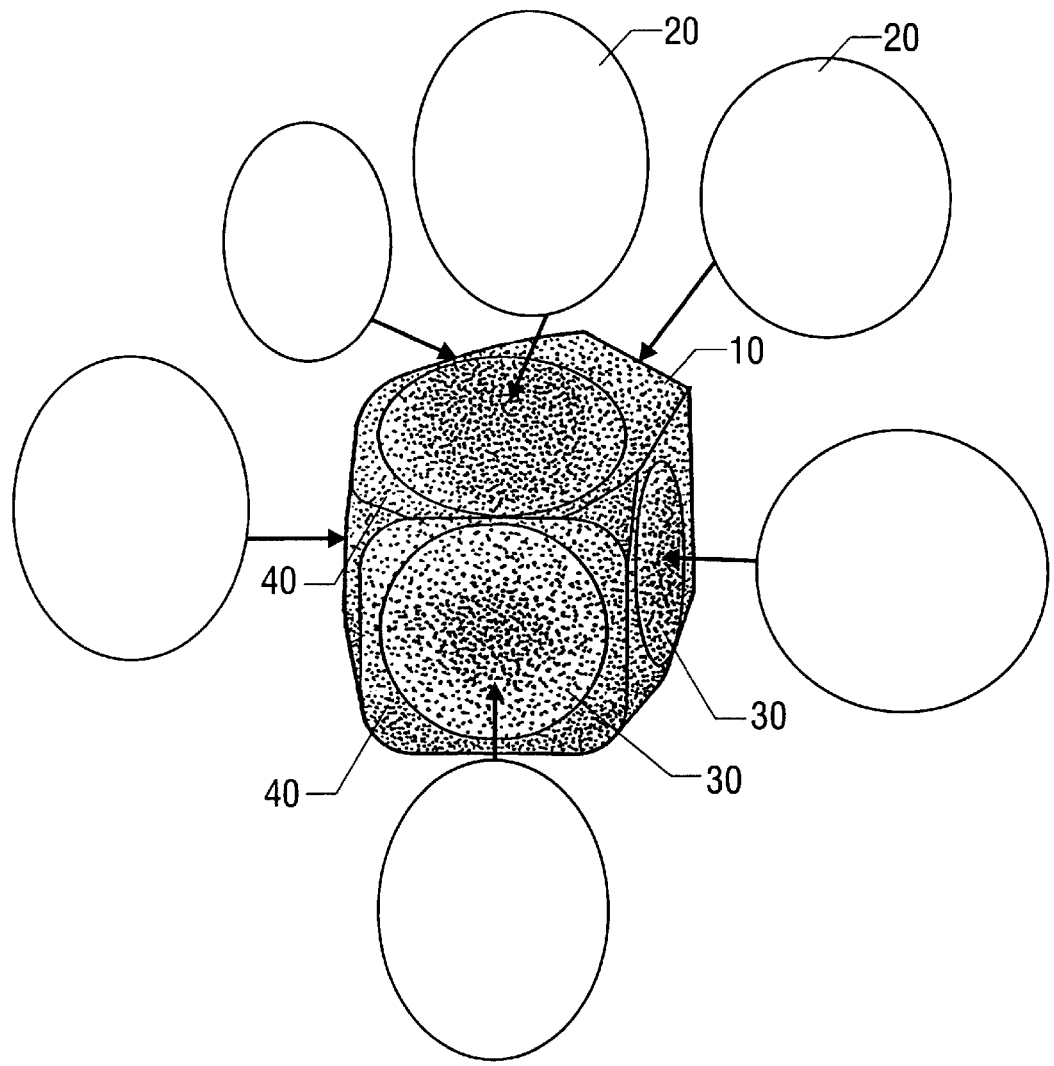
FIG. 4 is a representation of one mechanism believed responsible for deformation of the substantially spherical particle of FIG. 3 due to contact with fracture proppant under conditions of formation stress.

An example of a substantially spherical deformable beaded particle 10 according to one embodiment of the disclosed method is shown in FIG. 3. FIG. 4 illustrates one possible mechanism believed responsible for deformation of a substantially spherical particle 10 of FIG. 3 as a result of contact with individual particles of fracture proppant material 20 under conditions of formation stress. As seen in FIG. 4, proppant particles 20 create "dimpled" impressions 30 in the sides 40 of deformable particle 10 in which proppant particles 20 may reside.

Although a substantially spherical deformable beaded particle is illustrated in FIGS. 3 and 4, it will be understood with benefit of this disclosure that non-spherical beaded particles as well as non-beaded particle shapes may also be used successfully in the practice of the disclosed method. Examples of such non-spherical beaded particles include, but are not limited to, beaded particles having a shape that is elongated in one or more dimensions, such as particles that are oval shaped, egg-shaped, tear drop shaped, or mixtures thereof. Examples of such non-beaded particles include, but are not limited to, particles having a shape that is cubic, bar-shaped (as in a hexahedron with a length greater than its width, and a width greater than its thickness), cylindrical, multi-faceted, irregular, or mixtures thereof. In addition, it will be understood with benefit of the present disclosure that beaded or non-beaded deformable particles may have a surface that is substantially roughened or irregular in nature or a surface that is substantially smooth in nature. Moreover, it will also be understood that mixtures or blends of deformable particles having differing, but suitable, shapes for use in the disclosed method may be employed.

When deformable particles having a cylindrical shape or an elongated beaded shape with a substantially uniform diameter are employed in the practice of the disclosed method, particles having a length to diameter aspect ratio of equal to or less than about 5 are typically employed (as used herein, "length" is measured along the axis of a particle having the longest dimension). More typically, cylindrical or elongated beaded particles having a length to diameter aspect ratio of equal to or less than about 3 are employed. Most typically, cylindrical or elongated beaded particles having a length to diameter aspect ratio of equal to or less than about 2 are used. Similarly, when deformable particles having a bar-shape are employed, both the length to width ratio and the length to thickness ratio of a given individual particle are typically equal to or less than about 5, more typically equal to or less than about 3, and most typically equal to or less than about 2. When deformable particles having multi-faceted or irregular shapes, or shapes with tapered diameters are employed, the particles typically have a maximum length-based aspect ratio of equal to or less than about 5, more typically equal to or less than about 3, and most typically, equal to or less than about 2 As used herein, "maximum length based aspect ratio" means the maximum aspect ratio that may be obtained by dividing the length of a particle by the minimum (or shortest) dimensional value that exists along any other axis (other than the length axis) taken through the center of mass of the particle. It will also be understood with benefit of the present disclosure that particles of any shape (including any of the shapes described in this paragraph) may be employed in the disclosed method when such particles have a maximum length-based aspect ratio that is typically equal to or less than about 5, more typically equal to or less than about 3, and most typically equal to or less than about 2.

Figure 5:
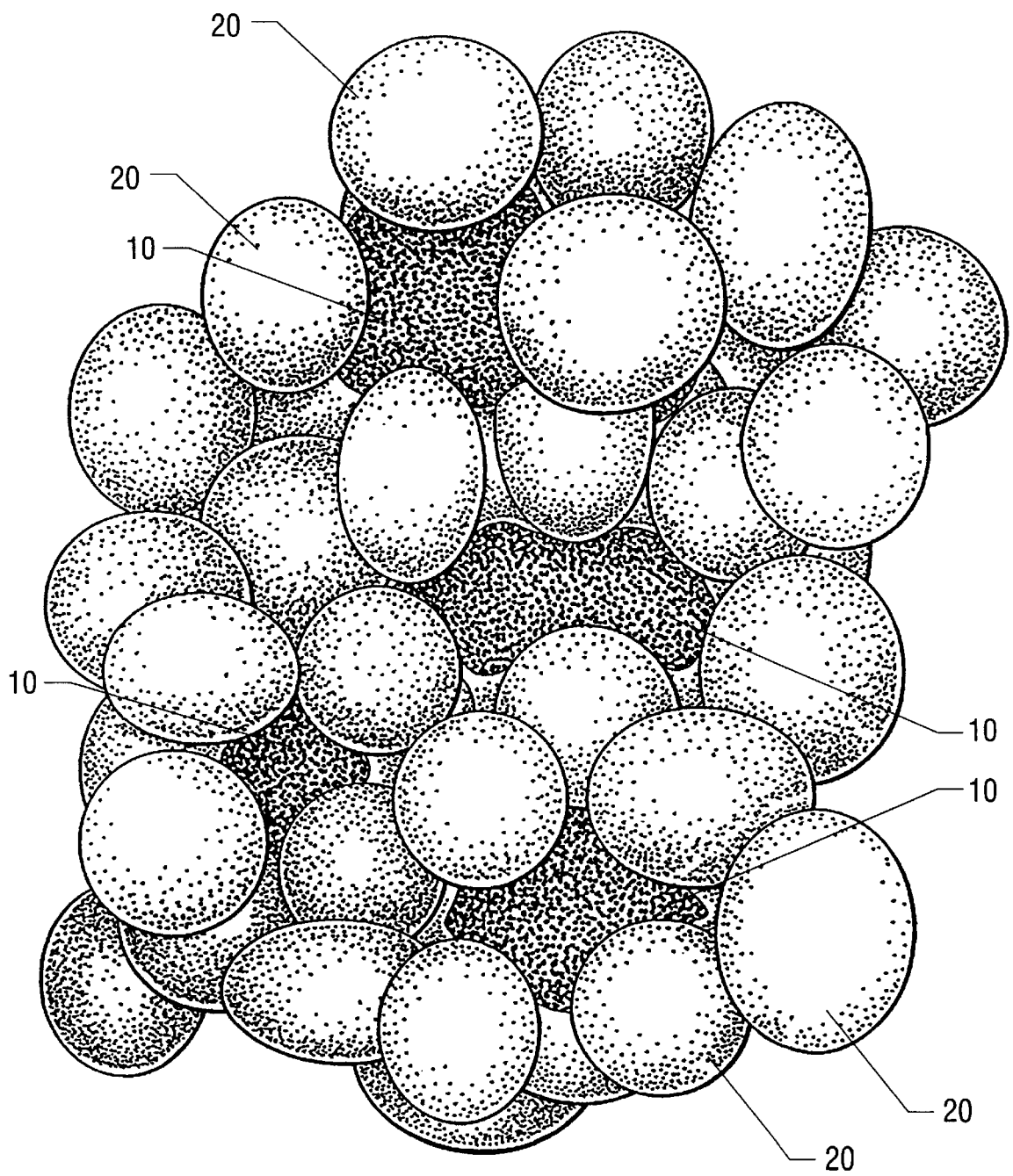
FIG. 5 is a representation of a multi-planar hexagonal close-packed structure believed to form in situ using one embodiment of the disclosed method having a 7:1 ratio of fracture proppant material to polystyrene divinylbenzene plastic beads.

An example of a multi-planar structure believed to form in situ from a mixture of deformable beaded particulate materials 10 and fracture proppant material 20 according to one embodiment of the disclosed method having a 7:1 blend of fracture proppant material to deformable particulate material is shown in FIG. 5. However, a multi-planar pack may be formed by other ratios of deformable material to fracture proppant material. When deformable particles are mixed with harder, non-deformable proppants, such as sand, proppant packs may be formed with proppant particles "locked" into deformed surfaces of the deformable particles, thus forming a stronger pack. However, no sticking or adherence between deformable particles and fracture proppant material is required in order to obtain the benefits of the disclosed method. Beaded particulate material is believed to deform into different shapes depending on the packing geometry surrounding each bead. Just a few of these shapes are illustrated in simplified geometrical form in FIGS. 6–9.

Figure 8:
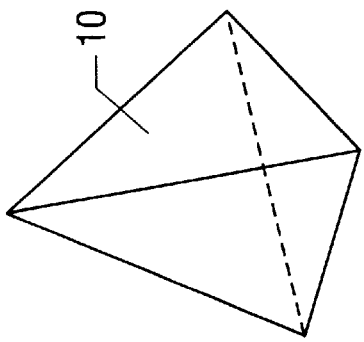
FIG. 8 is a simplified representation of one possible shape of a deformable beaded particle subjected to tetragonal contact with fracture proppant material.
Figure 7:
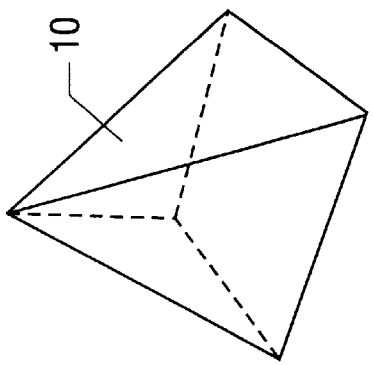
FIG. 7 is a simplified representation of one possible shape of deformable beaded particle subjected to pentagonal contact with fracture proppant material.
Figure 9:
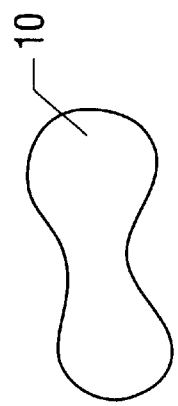
FIG. 9 is a simplified representation of one possible shape of a deformable beaded particle subjected to contact in two locations by fracture proppant material.
Figure 6:
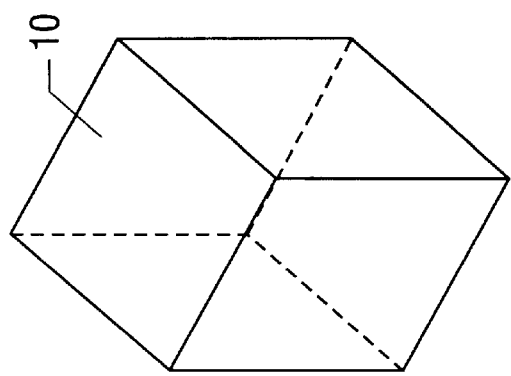
FIG. 6 is a simplified representation of one possible shape of a deformable beaded particle subjected to hexagonal contact with fracture proppant material.

Packing geometry is believed to be dependent on factors such as irregularity of the fracture proppant material, and a variety of geometries may exist in a single fracture pack. For example, FIGS. 6–8 illustrate approximate cuboidal and pyramidal shapes of beaded particulate material 10 that are believed to result from hexagonal (bead contacted by proppant in six locations), pentagonal (bead contacted by proppant in five locations), and tetragonal (bead contacted in four locations) packing, respectively. As shown in FIG. 9, where a bead 10 is contacted in only two locations by proppant, it may be deformed into a shape resembling a "dog bone." It will be understood with benefit of this disclosure that other packing configurations, mixtures of packing configurations, as well as numerous other shapes and mixtures of shapes of deformable particulate material are also possible.

By having appendages in several planes, stresses on a given deformable particle in one plane provides additional stabilization to adjacent particles in other planes. This effect is believed to be squared by benefit of stresses in a second plane and cubed by contributions of stresses in a third plane. In addition to contributing to beneficial effects not found in previous methods, such as increased fracture conductivity and reduced fines creation, this results in superior stabilization of a fracture pack. In addition, the use of deformable particle embodiments of the disclosed method may allow a well to be put on production faster than resin coated sand methods which require shut-in time for resin curing, thus providing a more rapid return on investment.

Advantageously, embodiments of the disclosed method may be selected to be chemically compatible with fracture fluid additives. In the practice of the disclosed method, deformable particles may be mixed with any substantially non-deformable proppant suitable to maintain a fracture in an oil, gas, geothermal, coalbed methane, water or other subterranean well. Such substantially non-deformable fracture proppant materials include, for example, silica (such as Ottawa, Brady or Colorado Sands), synthetic organic particles, glass microspheres, ceramics (including aluminosilicates such as "CARBOLITE," "NAPLITE" or "ECONOPROP"), resin-coated sand (such as "ACME BORDEN PR 6000" or "SANTROL TEMPERED HS"), sintered bauxite, and mixtures thereof. Typically, sand or synthetic fracture proppants are used. Most typically, sand is used as a fracture proppant.

In the practice of the disclosed method, any natural or synthetic particulate material that is substantially deformable under reservoir conditions in the presence of fracture proppant material to prevent formation of fines, improve fracture conductivity, and/or reduce flowback of proppant or formation materials may be employed. Examples of such substantially deformable particulate materials include, but are not limited to, those deformable materials having a Young's modulus of between about 500 psi and about 2,000,000 psi at formation conditions, more typically between about 5,000 psi and about 500,000 psi, more typically between about 5,000 psi and 200,000 psi at formation conditions, and most typically between about 7,000 and 150,000 psi at formation conditions. When used in the disclosed method, substantially deformable materials have a glass transition temperature that is greater than the reservoir temperature. Examples of such materials include, but are not limited to, polymers, cross-linked polymers and suitably deformable plastics. In this regard, with benefit of this disclosure deformable materials having varying or increased glass transition temperatures may be selected by those of skill in the art. For example, polystyrene beads with greater amounts of divinyl benzene crosslinker tend to have increased hardness and glass transition temperature.

Depending on formation conditions, materials that may be suitable in the practice of the disclosed method may include, but are not limited to cellulose acetate butyral, polystyrene acrylonitride, polytetrafluoroethylene, diglycol allyl carbonates, epoxy resins, polyester, furan, phenol formaldehyde, phenolic epoxy, urea aldehydes, silicones, acrylics, vinyl acetates, casein, and natural and synthetic rubbers. For example, at formation temperatures of from about 50° F. to about 450° F., crosslinked elastomeric or polymeric materials are typically employed.

Polymers that may be crosslinked for purpose of the disclosed method may include, but are not limited to, polystyrene, methylmethacrylate, nylon, polycarbonates, polyethylene, polypropylene, polyvinylchloride, polyacrylonitrile-butadiene-styrene, polyurethane, or any other suitable polymer, and mixtures thereof. For example, suitable crosslinkers may include divinylbenzene. Particularly suitable materials may include deformable particles manufactured of resin and/or those commercially available materials that do not substantially interact chemically with components of well treatment fluids and which are stable in a subterranean formation environment.

In the practice of the disclosed method deformable particles of crosslinked polymers may contain varying percentages of crosslinkers to produce proppant packs having varying stabilities and conductivities. In this regard, any amount of crosslinker suitable for forming a deformable particle may be employed. Percentages of crosslinker employed may be selected on many factors if so desired, such as the intended use of the deformable particle, the specific crosslinking agent, and other constituents which may optionally be present in the deformable particles. For example, changing the percentage of divinylbenzene crosslinker present in polystyrene divinylbenzene beads from about 14% to about 4% to about 0.5% to about 0.3% changes the confined Young's modulus at standard conditions from about 100,000 psi to about 70,000 psi to about 50,000 psi to about 30,000 psi, respectively.

In one embodiment of the disclosed method, polystyrene divinylbenzene plastic beads typically having between about 0.3% and about 55%, more typically between about 0.5% and about 20% by weight of divinylbenzene crosslinker are employed. For example, in one exemplary embodiment of the disclosed method typically employed at static bottom hole (or formation) temperatures of up to and including about 200° F., polystyrene divinylbenzene plastic beads having between about 0.5% and about 14% by weight of divinylbenzene crosslinker are employed. In this regard, divinylbenzene concentrations of polystyrene beads employed in this embodiment may be selected by those of skill in the art with benefit of this disclosure including, but not limited to, polystyrene divinyl benzene plastic beads containing less than or equal to about 14%, less than about 10%, less than about 5%, less than about 4%, less than about 3%, less than about 2%, less than about 1%, less than about 0.5%, or less than or equal to about 0.3% by weight of divinylbenzene crosslinker. Still other exemplary bead compositions that that may be selected for use in this embodiment include, but are not limited to, polystyrene divinylbenzene plastic beads containing from about 0.1% to about 14%, from about 0.1% to about 10%, from about 0.2% to about 4%, from about 0.3% to about 4%, from about 0.5% to about 4%, from about 0.3% to about 2%, from about 0.3% to about 1%, and from about 0.3% to about 0.5% divinylbenzene crosslinker by weight. Still other possible ranges include, but are not limited to, polystyrene divinylbenzene plastic beads containing respective amounts of about 0.3%, about 0.4%, about 0.5% to about 4%, about 4%, about 10%, or about 14% by weight divinylbenzene crosslinker by weight. It will be understood with benefit of this disclosure that the preceding concentration ranges for use at temperatures of up to about 200° F. are exemplary only, and that polystyrene divinylbenzene beads containing greater than about 14% by weight polystyrene divinylbenzene may also be employed at formation temperatures within this range.

In another embodiment of the disclosed method typically employed at formation temperatures of greater than about 200° F. and more typically at greater than about 200° F. and up to about 300° F., polystyrene divinylbenzene plastic beads having greater than about 14% by weight divinyl benzene crosslinker are employed. In this regard, divinylbenzene concentration of polystyrene beads employed in this embodiment may be selected by those of skill in the art with benefit of this disclosure including, but not limited to, polystyrene divinyl benzene plastic beads containing between greater than about 14% and about 55%, and between greater than about 14% and about 20% by weight of divinylbenzene crosslinker. It will be understood with benefit of this disclosure that the preceding concentration ranges for use at formation temperatures of greater than about 200° F. are exemplary only, and that polystyrene divinylbenzene beads containing less than or equal to about 14% by weight polystyrene divinylbenzene may also be employed at formation temperatures within this range.

However, notwithstanding the above, it will also be understood with benefit of this disclosure that polystyrene divinylbenzene beads having amounts of divinylbenzene crosslinker less than about 0.2% or less than about 0.1% by weight may also be employed at any given formation temperature if so desired. Further, it will be understood that the polystyrene divinylbenzene beads disclosed herein may be employed at temperatures of greater than about 300° F., is so desired.

It will be understood with benefit of the present disclosure that polystyrene divinylbenzene plastic beads having the above-described concentration ranges of divinylbenzene crosslinker may be used under a wide variety of formation conditions. For example, it may be preferable to use beads containing less divinylbenzene crosslinker at lower formation closure stresses, as well as at lower temperatures. Thus, in one exemplary embodiment, polystyrene divinylbenzene plastic beads having from about 0.3% to about 0.5% by weight divinylbenzene crosslinker may optionally be employed in the treatment of formations having closure stresses of less than or equal to about 6000 psi. In another exemplary embodiment, polystyrene divinylbenzene plastic beads having greater than or equal to about 4% by weight divinylbenzene crosslinker may be employed in treatment of formations having closure stresses of greater than about 6000 psi. With benefit of this disclosure, those of skill in the art will appreciate that the exemplary embodiments given herein only serve to illustrate certain possible aspects of the disclosed method and therefore do not limit the use of various polystyrene divinylbenzene beads having these or other specific concentration ranges of divinylbenzene crosslinker at other closure stresses or ranges of closure stresses than so exemplified.

Many other deformable bead embodiments may also be employed in the practice of the disclosed method. For example, the polymer type and/or composition of a deformable particle may be varied in order to further tailor the characteristics of deformable particles to anticipated formation conditions and/or to optimize cost versus benefits of the disclosed method, if so desired. In this regard, deformable particles may be formulated to comprise co-polymers for use at higher formation temperatures, such as temperatures greater than about 300° F. For example, terpolymer compositions (such those comprising polystyrene/vinyl/divinyl benzene, acrylate-based terpolymer, other terpolymers, etc.) may be employed.

Figure 10:
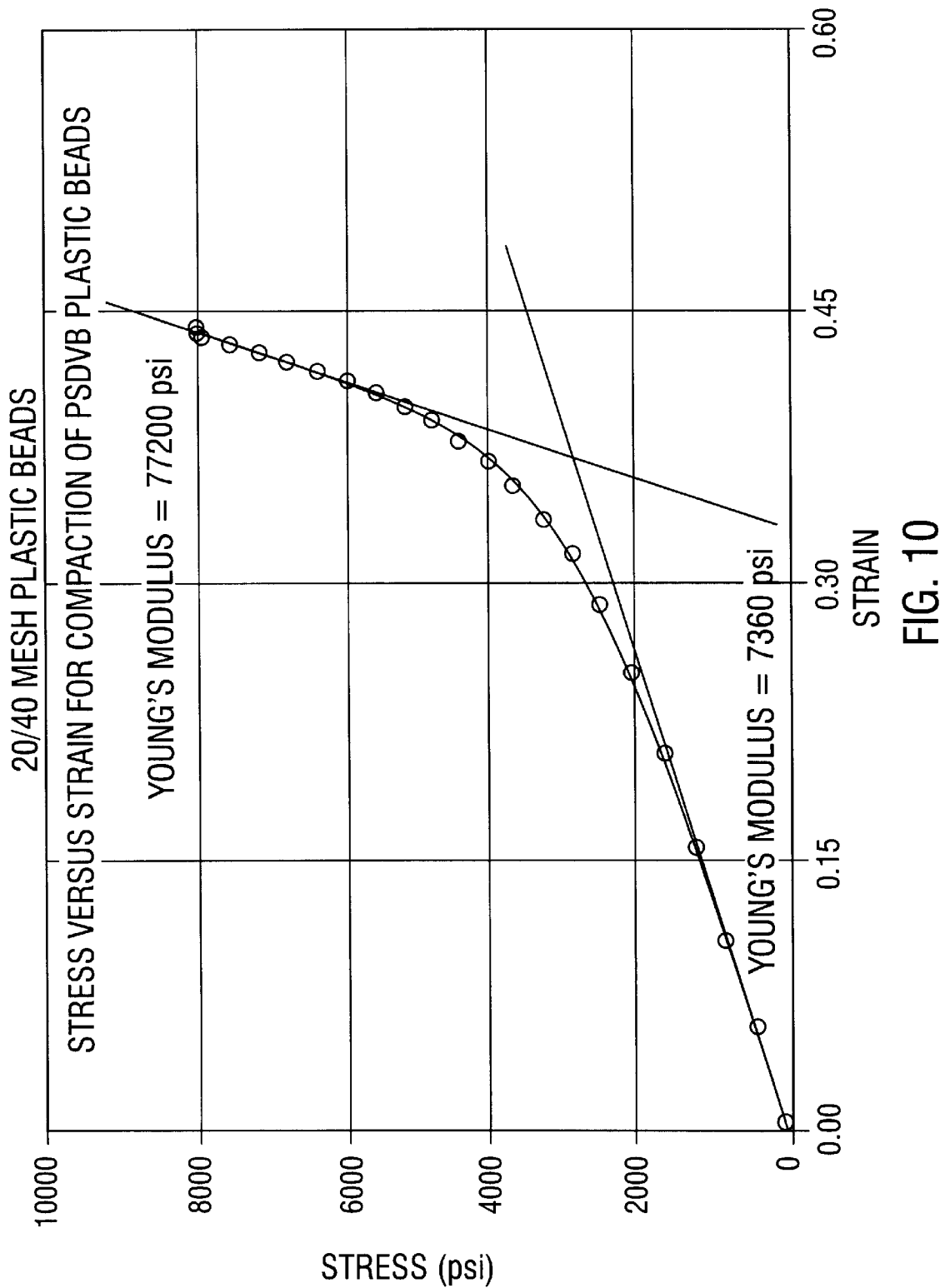
FIG. 10 illustrates stress versus strain, and shows variation in Young's modulus of elasticity for polystyrene divinylbenzene plastic beads.

For illustration purposes, Table I includes a partial listing of melting point, glass transition temperature and Young's modulus of elasticity values for some of the polymer materials listed above. In the practice of the disclosed method, polystyrene divinylbenzene particles are typically employed at formation temperatures from about 150° F. to about 300° F., and at formation stress values of from about 500 psi to about 12,000 psi. For lower formation temperatures, such as below about 150° F., materials such as rubbers or non-crosslinked polymers, including non-crosslinked species of those polymers described above, may be suitable. At higher formation temperatures, such as above about 300° F., materials such as polyvinylchloride or soft metals, including lead, copper, and aluminum, may be employed. For any given material, values of Young's modulus may vary with in situ formation conditions, such as temperature and pressure (or stress). As an example, FIG. 10 illustrates the relationship between values of Young's modulus and stress for polystyrene divinylbenzene beads.

TABLE I

| Polymer | Melting Point, °C. | Glass Transition Temp. °C. | Modulus of Elasticity, psi Lower Range | Modulus of Elasticity, psi Upper Range |
|---|---|---|---|---|
| polyacrylonitrile-butadiene-styrene | | 90–120 | — | |
| melamine-formaldehyde | | | 1,300,000 | 1,950,000 |
| polystyrene | 240 | 85–105 | 400,000 | 600,000 |
| methylmethacrylate | 100 | | 350,000 | 500,000 |
| polycarbonate | | 105 | 290,000 | 325,000 |
| polyvinylchloride | 285 | 75–105 | 200,000 | 600,000 |
| high density polyethylene | 135 | | 85,000 | 160,000 |
| low density polyethylene | 115 | | 35,000 | 90,000 |
| polystyrene divinylbenzene | | | 7,000 | 150,000 |
| polypropylene | 168 | 25 | 1,400 | 1,700 |
| polyurethane | | 90–105 | | |

FIG. 5 illustrates just one embodiment of a multi-planar structure believed to be formed in situ between beaded deformable particles and fracture proppant material in the practice of the disclosed method. In the disclosed method, deformable particles of any size and shape suitable for forming multi-planar structures or networks in situ with fracture proppants may be employed, such as those particles having shapes as mentioned previously. This also includes any deformable particles suitable for forming multi-planar structures or networks that offer improved fracture conductivity and/or reduced fines creation over conventional proppant packs.

Fracture proppant sizes may be any size suitable for use in a fracturing treatment of a subterranean formation. It is believed that the optimal size of deformable particulate material relative to fracture proppant material may depend, among other things, on in situ closure stress. In this regard, deformable particles having a size substantially equivalent or larger than a selected fracture proppant size are typically employed. For example, a deformable particulate material having a larger size than the fracture proppant material may be desirable at a closure stress of about 1000 psi or less, while a deformable particulate material equal in size to the fracture proppant material may be desirable at a closure stress of about 5000 psi or greater. However, it will be understood with benefit of this disclosure that these are just optional guidelines. Typically, a deformable particle is selected to be at least as big as the smallest size of fracture proppant being used, and may be equivalent to the largest fracture proppant grain sizes. In either case, all things being equal, it is believed that larger fracture proppant and deformable particulate material is generally advantageous, but not necessary. Although deformable particulate material smaller than the fractured proppant may be employed, in some cases it may tend to become wedged or lodged in the fracture pack interstitial spaces. Deformable particles used in the disclosed method typically have a beaded shape and a size of from about 4 mesh to about 100 mesh, more typically from about 8 mesh to about 60 mesh, even more typically from about 12 mesh to about 50 mesh, even more typically from about 16 mesh to about 40 mesh, and most typically about 20/40 mesh. Thus, in one embodiment, deformable particles may range in size from about 1 or 2 mm to about 0.1 mm; more typically their size will be from about 0.2 mm to about 0.8 mm, more typically from about 0.4 mm to about 0.6 mm, and most typically about 0.6 mm. However, sizes greater than about 2 mm and less than about 0.1 mm are possible as well.

Deformable particles having any density suitable for fracturing a subterranean formation may be employed in the practice of the disclosed method. However, in one typical embodiment, the specific gravity of a deformable particulate material is from about 0.3 to about 3.5, more typically from 0.4 to about 3.5, more typically from about 0.5 to about 3.5, more typically from about 0.6 to about 3.5, and even more typically from about 0.8 to about 3.5. More typically a deformable particulate material having a specific gravity of from about 1.0 to about 1.8 is employed, and most typically a deformable particle having a specific gravity of about 1.0 to about 1.1 is employed. In another specific embodiment, a particular divinylbenzene crosslinked polystyrene particle may have a bulk density of from about 0.4 to about 0.65, and most typically of about 0.6. In another specific exemplary embodiment, a particular divinylbenzene crosslinked polystyrene particle may have a specific gravity of about 1.055. However, other specific gravities are possible. Advantageously, when deformable particles having a density less than that of a selected fracture proppant material are employed, reduced treating pressures and concentration levels of potentially formation-damaging gelled or viscous fluids may be employed. This may allow higher treating rates and/or result in higher formation productivity.

Deformable particles may be mixed and pumped with fracture proppant material throughout or during any portion of a hydraulic fracturing treatment in the practice of the disclosed method. However, when deformable particulate material is mixed with only a portion of a fracture proppant material pumped into a formation, it is typically mixed with proppant during the latter stages of the treatment in order to dispose the deformable particulate material in the fracture pack at or near the point where the well bore penetrates a subterranean formation. In the practice of the disclosed method, it is also possible that mixtures of deformable particles and fracture proppant material may be pumped in any number of multiple stages throughout a fracture treatment job.

In the practice of the disclosed method, any suitable concentration of deformable particles may be mixed with fracture proppant material, with greater concentrations of deformable particles typically resulting in a greater reduction in fines generation for a given formation and proppant material. However, in one embodiment, ratio of substantially non-deformable fracture proppant material to deformable particulate material in a deformable particle/fracture proppant material mixture is from about 20:1 (or about 5% by volume deformable particulate) to about 0.5:1 (or about 67% by volume deformable particulate) by volume of total volume of deformable particle/fracture proppant mixture. In a further embodiment, a ratio of fracture proppant to deformable particulate material may be from about 1:1 to about 15:1 by volume of total volume of deformable particle/fracture proppant mixture. More typically, a ratio of fracture proppant to deformable particulate material is about 3:1 to about 7:1. Most typically, a ratio of about 3:1 is employed. In another embodiment of the disclosed method, concentrations of deformable particulate material in a deformable particle/fracture proppant mixture may be from about 1% to about 50% by weight of total weight of fracture proppant mixture, more typically from about 10% to about 25% by weight of total weight of fracture proppant mixture, more typically from about 15% to about 25% by weight of total weight of fracture proppant mixture and most typically about 15% by weight of total weight of fracture mixture.

In the practice of the disclosed method, deformable particulate material may be mixed with a fracture proppant or mixture of fracture proppants in any manner suitable for delivering such a mixture to a subterranean formation. For example, deformable particles may be mixed with a fracture proppant prior to mixing with carrier fluid, or deformable particles may be mixed with carrier fluid before or after a carrier fluid is mixed with a proppant. Deformable particulate materials may also be mixed in a solution which is later added to proppant or carrier fluid as it is pumped. Additionally, mixtures or blends of deformable particles and fracture proppant may be injected into a subterranean formation in conjunction with other treatments at pressures sufficiently high enough to cause the formation or enlargement of fractures, or to otherwise expose the blend of deformable particles and fracture proppant material to formation closure stress. Such other treatments may be near wellbore in nature (affecting near wellbore regions) and may be directed toward improving wellbore productivity and/or controlling the production of fracture proppant or formation sand. Particular examples include gravel packing and "frac-packs."

In the practice of the disclosed method, any carrier fluid suitable for transporting a mixture of fracture proppant material and deformable particles into a formation fracture in a subterranean well may be employed including, but not limited to, carrier fluids comprising salt water, fresh water, liquid hydrocarbons, and/or nitrogen or other gases. Suitable carrier fluids include or may be used in combination with fluids have gelling agents, cross-inking agents, gel breakers, curable resins, hardening agents, solvents, surfactants, foaming agents, demulsifiers, buffers, clay stabilizers, acids, or mixtures thereof.

Polystyrene divinylbenzene plastic beads for use with the disclosed methods may be prepared by methods that would be apparent to those of skill in the art or purchased from "DOW CHEMICAL."

Typically, cross-linked polystyrene beads having a specific gravity of from about 1.0 to about 1.8 are employed. In a most typical embodiment of the disclosed method, 20–40 mesh polystyrene divinylbenzene copolymer plastic beads having a specific gravity of about 1.0 are mixed with 20/40 mesh Ottawa sand at a ratio of about 3:1 by weight. These beads are commercially available as a lubrication fluid from "SUN DRILLING PRODUCTS" under the brand name "LUBRAGLIDE," or as ion exchange beads manufactured by "DOW CHEMICAL." These beads offer crush resistance, are resistant to solvents, and are substantially round and smooth, having length to width and length to height ratios of about 1:1. Since the polystyrene divinylbenzene plastic beads of this embodiment have a reduced bulk density (i.e., about 0.64 $gm/cm^3$), the beads may be suspended in frac fluids with a significant reduction in gelling agents. With a reduction in density, these plastic beads require less packing density (i.e., $lb/ft^2$) to achieve the same fracture width. Test results indicated that these plastic beads are deformable under conditions of stress and relative to sand proppant. Test results also showed that these beads are compatible with oil field solvents and acids. Favorable formation treating characteristics offered by polystyrene divinylbenzene beads include, among other things, strength, crush resistance, chemical resistance, elasticity, high glass transition temperature. These beads are also "non-creeping" (i.e., resistant to slow change in shape due to constant force).

When plastic beads of this embodiment are mixed with substantially spherical fracture proppant material of substantially uniform size, a hexagonal-close-pack (HCP) structure is believed to be possible (i.e., typically generating six contact points for each plastic bead). Each contact point may generate a substantially flat face at higher stresses as the plastic grains are forced into a smaller volume, such as under conditions of closure stress. Since plastic beads of this embodiment of the disclosed method may deform to form substantially flat surfaces on multiple sides, Young's modulus for a proppant pack incorporating these beads may be increased, consequently increasing particle cohesion and proppant pack stability, and decreasing flowback of proppant. When plastic beads of this embodiment are mixed with harder, non-deformable proppants, such as sand, proppant packs may be formed with proppant particles "locked" into deformed surfaces of the plastic beads, thus forming a stronger pack. Although substantially spherical fracture proppant material of substantially uniform size is described in this embodiment, it will be recognized with benefit of this disclosure that non-spherical and/or non-uniformly sized fracture proppant material may also be successfully employed in the practice of the disclosed method.

In alternative embodiments of the disclosed method, multi-component or multiple component deformable particles may be utilized. As used herein "multi-component" or "multiple component" means a particle comprised of at least two materials having different deformation characteristics (such as differing values of elastic modulus). Typically, at least one component of such a multi-component particle has the characteristic of being substantially deformable, and at least one other component of the particle has the characteristic of being substantially non-deformable relative to the deformable component. The two or more materials may be configured in virtually any manner desired to form multi-component particles, for example, to achieve varying overall deformation characteristics of such particles. Possible particle configurations include, but are not limited to, layered particles (such as concentrically layered particles), agglomerated particles, stratified particles, etc. Such multi-component deformable particles may be employed with substantially non-deformable fracture proppant material in any of the amounts described elsewhere herein for deformable particles. Furthermore, such multi-component deformable particles may be employed alone so as to make up all, or substantially all, of a fracture pack with little or no substantially non-deformable fracture proppant material present in the pack.

In one such embodiment, layered multi-component deformable particles may be provided that comprise a substantially hard or non-deformable core surrounded by one or more layers of substantially deformable material. Although applicable for use over a wide range of fracture proppant conditions, such layered multi-component deformable particles may be particularly desirable for use with higher anticipated formation temperatures and/or higher anticipated formation closure stresses due to the ability to provide sufficient elasticity or deformability of the surface of the particle without being susceptible to excessive or total deformation of the particles. This property is advantageously provided by the substantially hard core of the layered particle which resists excessive deformation.

Figure 27:
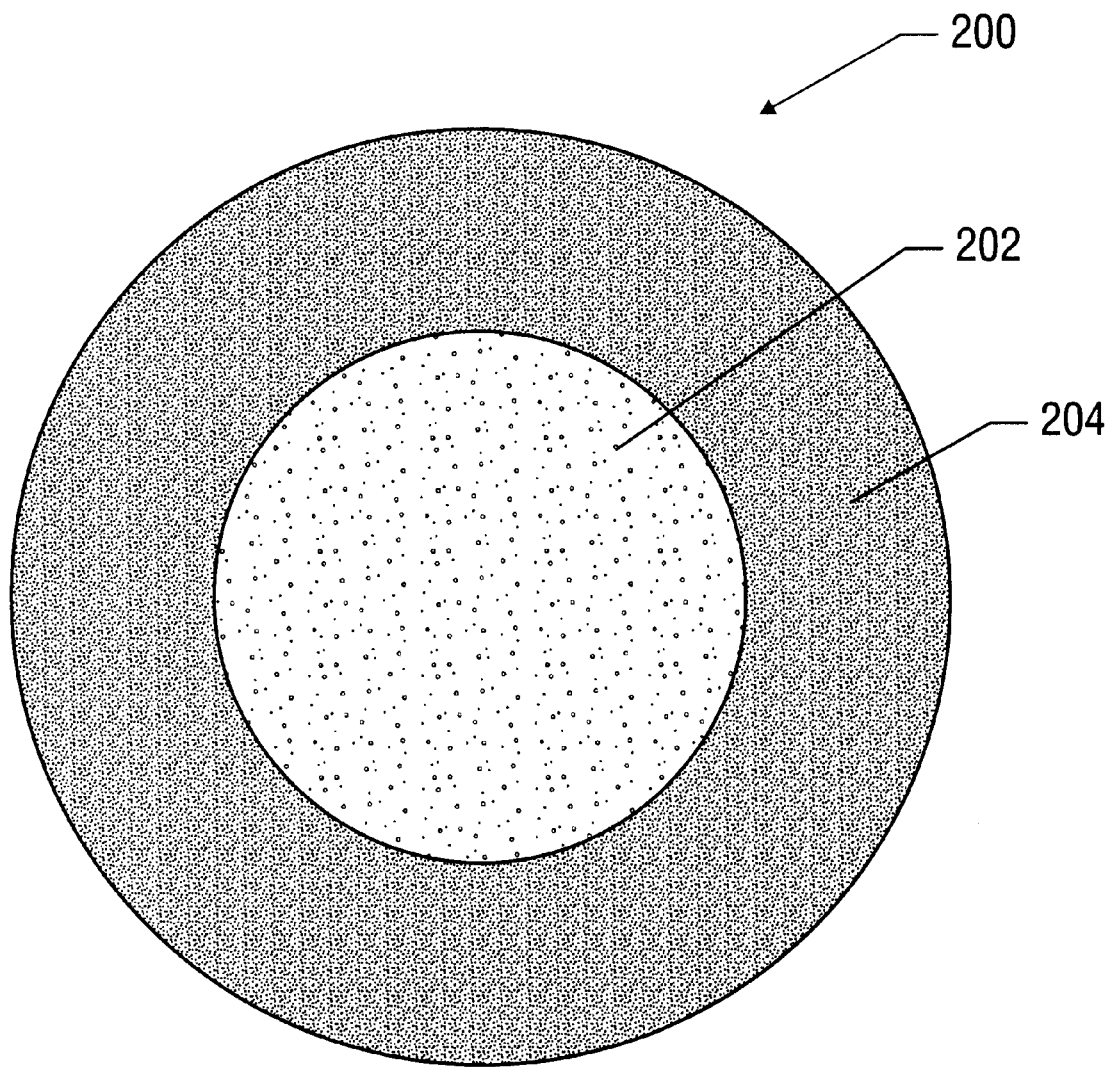
FIG. 27 is a representation of a layered deformable beaded particle including a substantially non-deformable core surrounded by a substantially deformable coating or layer according to one embodiment of the disclosed method.

In one exemplary embodiment depicted in FIG. 27, a layered multi-component deformable particle 200 may be provided using a proppant particle or other substantially hard or substantially non-deformable material core 202 coated by a substantially deformable material 204. Advantageously, such a layered deformable particle may be formulated to be capable of withstanding total deformation, particularly at high formation temperatures and formation stresses (i.e., formation temperatures exceeding about 300° F. and formation stresses exceeding about 6000 psi). A substantially hard core of such a layered deformable particle may be selected to provide sufficient strength or hardness to prevent total deformation of the particle at temperatures and/or formation closure stresses where substantially deformable materials (such as crosslinked polymers) generally become plastic. In this regard, it is believed that total or near-total deformation of a deformable particle in a proppant pack is undesirable because it may damage fracture proppant pack permeability when the amount of deformation reaches levels sufficient to plug proppant pack pore spaces.

Although a layered deformable particle having a substantially non-deformable inner core surrounded by a single layer of substantially deformable material is depicted in FIG. 27, it will be understood with benefit of this disclosure, that one or more layers of deformable material/s may be utilized to provide a substantially deformable coating over a substantially non-deformable or hard inner core. Similarly, it will also be understood that a substantially non-deformable inner core may comprise more than one layer or thickness of substantially non-deformable material. Furthermore layers of such non-deformable and deformable materials may be alternated if so desired. In any case, a deformable coating is typically provided in a thickness or volume sufficient to allow adjacent and relatively hard fracture proppant particles in a fracture proppant pack to penetrate all or a portion of the deformable coating so as to provide one or more benefits of deformable particles as described elsewhere herein, but without substantially reducing porosity of a fracture pack due to excessive deformation. In this regard, a substantially non-deformable inner core acts to limit undesirable distortion of the deformable particle so as to prevent excessive damage to the conductivity of a fracture proppant pack.

Figure 28:
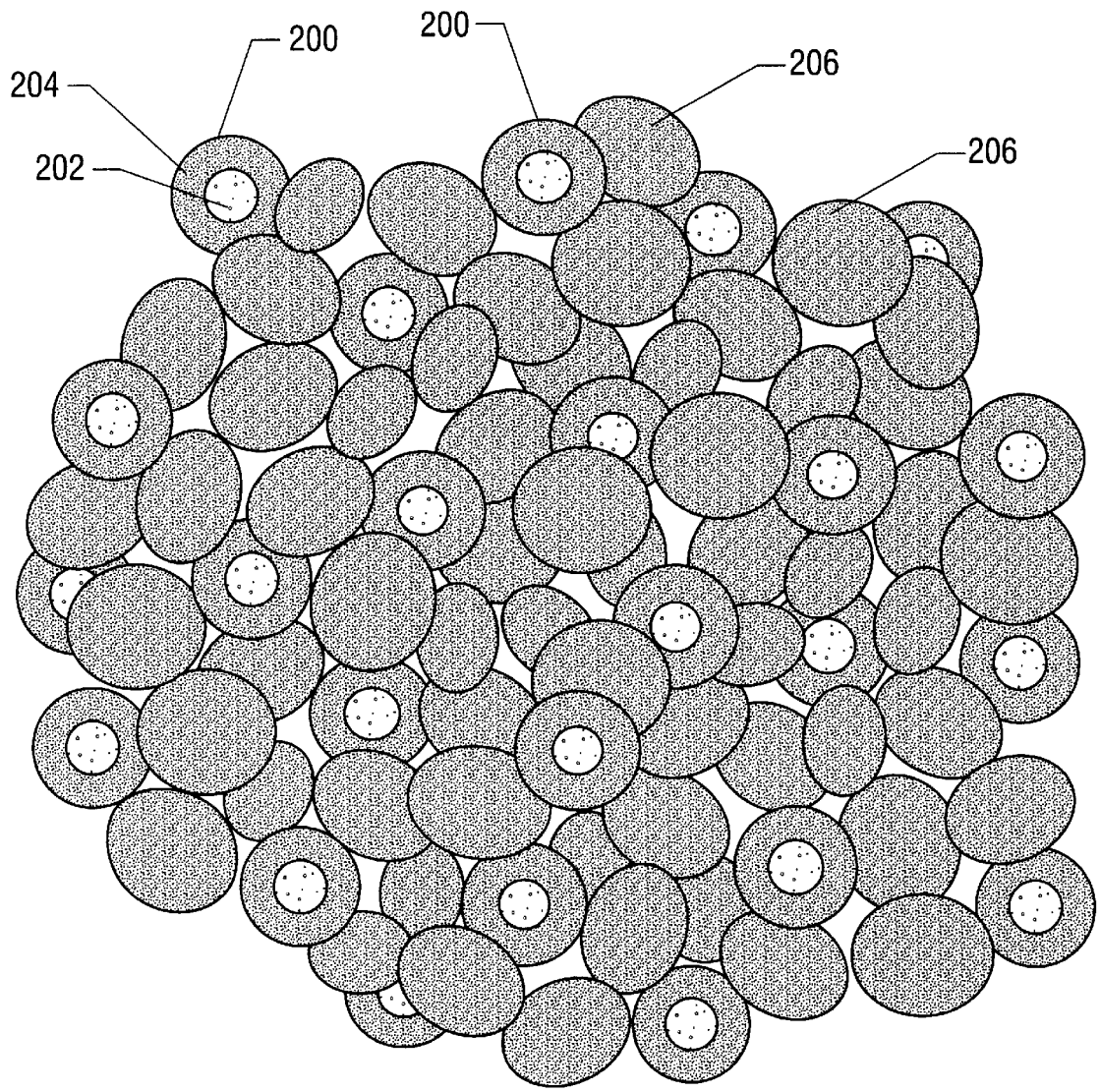
FIG. 28 is a representation of a fracture proppant pack believed to form in situ using one embodiment of the disclosed method employing a mixture of layered deformable beaded particles and substantially non-deformable fracture proppant material.
Figure 29:
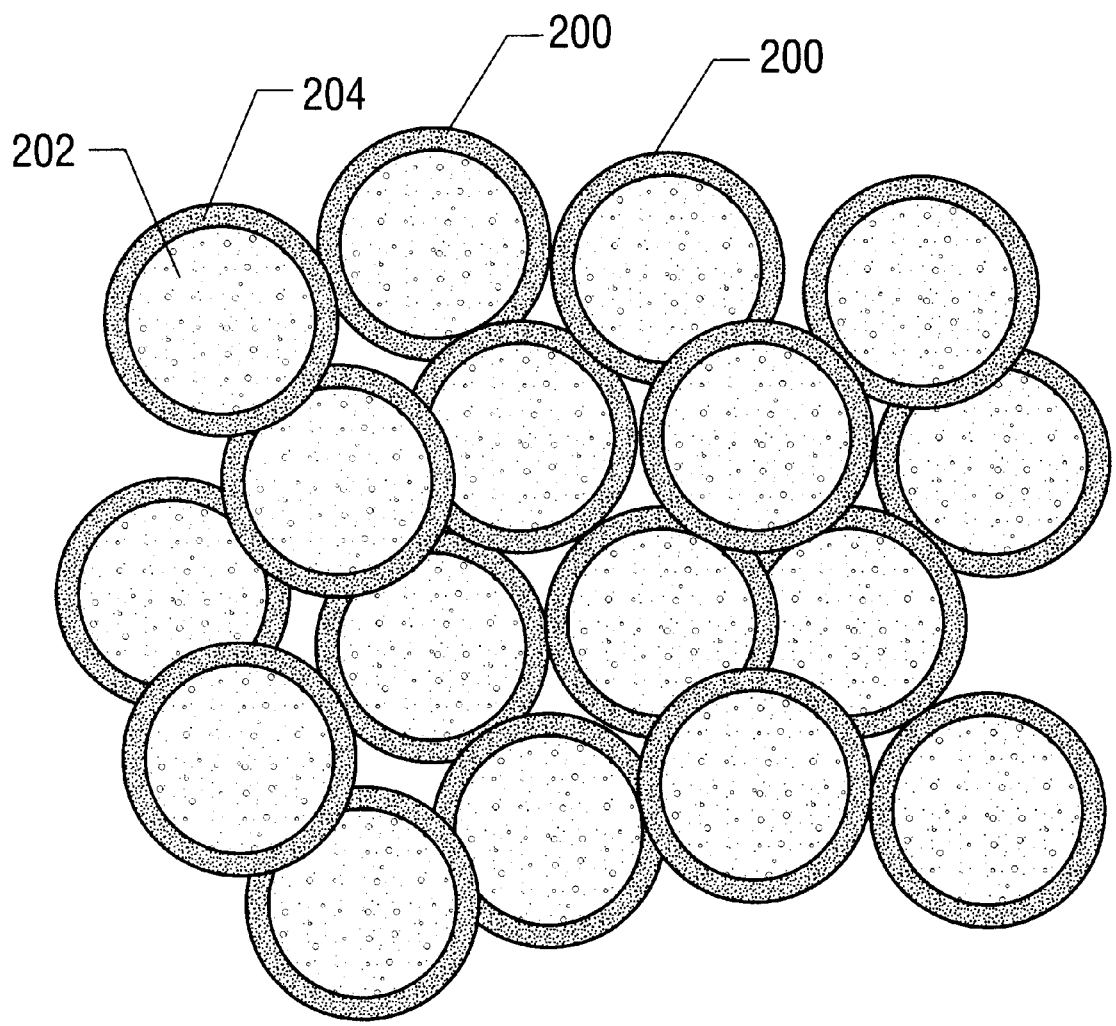
FIG. 29 is a representation of a fracture proppant pack believed to form in situ using one embodiment of the disclosed method employing only layered deformable beaded particles.

The deformable outer layer/s of a layered deformable particle acts to prevent damage to a proppant pack by preventing the creation of proppant fines that occur, for example, when increased stress is applied on a proppant pack and where uncoated fracture proppant grains are in point to point contact as stress is increased. FIG. 28 illustrates just one possible embodiment of a multi-planar structure believed to be formed in situ between layered deformable particles 200 and fracture proppant particles 206 in the practice of the disclosed method. As with other embodiments of the disclosed method, layered deformable particles of any size and shape suitable for forming multi-planar structures or networks in situ with fracture proppants may be employed, including deformable particles having shapes as mentioned previously. Furthermore, layered deformable particles 200 may be utilized alone in well stimulation treatments to create proppant packs comprising only deformable particles 200 as depicted in FIG. 29.

In the practice of the disclosed method, a layered deformable particle may have one or more layers or coatings of deformable material which may include any of the deformable materials mentioned elsewhere herein. In one exemplary embodiment, layered deformable particles include one or more coatings of crosslinked polymers. Suitable crosslinked polymers include, but are not limited to, polystyrene, methylmethacrylate, nylon, polycarbonate, polyethylene, polypropylene, polyvinylchloride, polyacrylonitrile-butadiene-styrene, polyurethane, mixtures thereof, etc. However, it will be understood with benefit of the disclosure that any other deformable material suitable for coating a substantially hard proppant core and having suitable deformable characteristics as defined elsewhere herein may be employed.

In the practice of the disclosed method, a core of a layered deformable particle may comprise any material or materials suitably hard enough to form a substantially nondeformable core about which one or more layers of deformable material may be disposed. In this regard, a core is typically a fracture proppant such as sand or any of the other substantially non-deformable fracture proppants mentioned elsewhere herein. For example, a suitable core material may be silica (such as Ottawa sand, Brady sand, Colorado sand, etc.), synthetic organic particles, glass microspheres, sintered bauxite (including aluminosilicates), ceramics (such as CARBOLITE from Carbo Ceramics, Inc., NAPLITE from Norton Alcoa, ECONOPROP, from Carbo Ceramics, Inc. etc.), suitably hard plastic (such as nylon), suitably hard metal (such as aluminum), etc. In one embodiment a core material may have a Young's modulus that is suitably hard and non-deformable relative to the Young's modulus of layers of deformable material disposed thereabout. For example, in this embodiment a core material may have a Young's modulus greater than about 500,000 psi, alternatively a Young's modulus between about 500,000 psi and about 15,000,000 psi or alternatively a Young's modulus of between about 2,000,000 psi and about 15,000,000 psi.

A deformable layer or coating around a substantially non-deformable particle core may be any thickness suitable for allowing deformation of the layer upon contact with fracture proppant materials under closure stress. However, typically thickness of such layer/s are limited such that deformation under anticipated formation closure stress does not result in damage to conductivity due to excessive deformation and impingement into fracture proppant pack pore spaces. In this regard, a layer/s of deformable material typically is thick enough to provide a coating sufficient for reducing proppant flowback and/or fines generation by allowing adjacent relatively hard fracture proppant material to embed in the layers of deformable material without substantially reducing porosity or conductivity of the proppant pack.

In one exemplary embodiment of the disclosed method, one or more layers of deformable material comprise at least about 10% by volume or alternatively at least about 20% by volume of the total volume of the layered deformable particle. Alternately, in this embodiment one or more layers of deformable particulate material may comprise respectively from about 10% to about 90%, from about 20% to about 90%, from about 20% to about 70%, from about 40% to about 70%, or about 70% by volume of total volume of a layered deformable particle. However, it will be understood that one or more layers of deformable material may comprise less than about 10% by volume of the total volume of a layered deformable particle, and greater than about 90% by volume of the total volume of a layered deformable particle. In yet another embodiment, one or more layers of deformable material may comprise greater than 8%, or alternatively greater than about 10%, by weight of the total weight of a layered deformable particle.

In another exemplary embodiment, the thickness of the outside layer or coating of a two component deformable particle may be substantially equivalent to the diameter or thickness of the particle core. As an example, a substantially hard core having a 40 mesh size may be coated with sufficient deformable material to produce a 20 mesh two-layer or two-component deformable particle. Although substantially spherical layered deformable particles have been described herein, it will be understood by those of skill in the art with benefit of this disclosure that non-spherical layered deformable particles having any of the deformable particle shapes as described elsewhere herein may also be employed.

In one embodiment employing a mixture of layered deformable particles and fracture proppant material, the thickness of one or more outside layers or coatings of deformable material is typically equal to or greater than the non-deformable core diameter for each particle. In another embodiment employing all or substantially all layered deformable particles to form a fracture pack, the thickness of the one or more outside layers or coatings of deformable material is typically equal to or less than about 10% of the diameter of the non-deformable core of each particle. However, these are only exemplary embodiments and merely illustrate that thinner layers may be employed when deformable particles make up more or substantially all of a fracture pack, and that thicker layers may be employed when relatively greater amounts of substantially non-deformable fracture proppant materials are present in a fracture pack.

Although any deformable material described elsewhere herein may be employed for one or more layers of a layered deformable particle, in one embodiment materials having a modulus of between about 500 psi and about 2,000,000 psi, or alternatively between about 5,000 psi and about 200,000 psi, may be employed. Typically such deformable materials are selected to be chemically resistant and substantially non-swelling in the presence of solvents as described elsewhere herein.

In one exemplary embodiment, a layered deformable particle comprises a silica core material surrounded by a single layer or coating of polystyrene divinylbenzene co-polymer (having from about 0.5% to about 20% by weight divinyl benzene cross-linker). In this embodiment the core material has a modulus of about 2,000,000 psi to about 5,000,000 psi and the single layer coating has a modulus of about 70,000 psi. However, with benefit of this disclosure, those of skill in the art will understand that core and layer material selection may be varied based on anticipated formation conditions such as temperature, pressure and closure stress, as well considerations of cost. In this regard, as with single component deformable particles, materials having relatively lower modulus values are typically selected for use in shallower and/or lower temperature and/or lower stress wells while deformable materials with relatively higher modulus values are selected for use in deeper and/or higher temperature and/or higher stress wells.

The disclosed layered deformable particles may be of any overall size suitable for use in a fracture proppant pack, either alone or in a mixture with fracture proppant material, as well as in sizes as described elsewhere herein. Typically, a layered deformable particle for inclusion in a mixture with fracture proppant is selected to have a size at least as large as the smallest fracture proppant particles being used. Alternatively, a layered deformable particle for use in a mixture with fracture proppant is selected to have a size equal to the largest fracture proppant particles. In one exemplary embodiment, a layered deformable particle has a size typically from about 4 mesh to about 100 mesh, more typically from about 12 mesh to about 50 mesh, and most typically about 20/40 mesh.

As described above, layered deformable particulate materials may be employed alone as a fracture proppant material (i.e., without another type of fracture proppant material), or may be employed with mixtures of fracture proppant material as previously described for single component deformable particles. In this regard, layered deformable particles may be mixed with a fracture proppant material in any of the weight percentages or ratios relative to fracture proppant material as described elsewhere herein.

Although, embodiments of the disclosed method employing layered multi-component deformable particles having two components or layers have been described and illustrated above, it will be understood that other configurations of layered multi-component deformable particles may be employed. For example, layered particles may include a substantially hard core with two or more layers of deformable materials surrounding the core. Any combination of two or more deformable materials mentioned elsewhere herein may be employed in multi-component deformable particles having a core surrounded by two or more layers. In this regard, deformable particles having two or more layers of deformable materials may be useful for providing the desired degree of deformability in combination with other desirable properties. For example, a first layer of relatively soft deformable material may be surrounded or covered by a second or outside layer of relatively hard, but chemical resistant deformable material. In this way sufficient particle deformability and chemical resistance at high temperatures may be provided simultaneously. In another example, a relatively softer and more chemical resistant second or outer layer of deformable material may surround a first layer of relatively harder, less chemical resistant deformable material. In one particular exemplary embodiment, a two-layer multi-component deformable particle may include a substantially hard 40 mesh Ottawa sand core surrounded by a first layer of substantially deformable acrylate or acrylic polymer and a second layer of substantially deformable polystyrene. Such a particle configuration provides deformability and strength over a larger range of temperatures and stresses.

Figure 30:
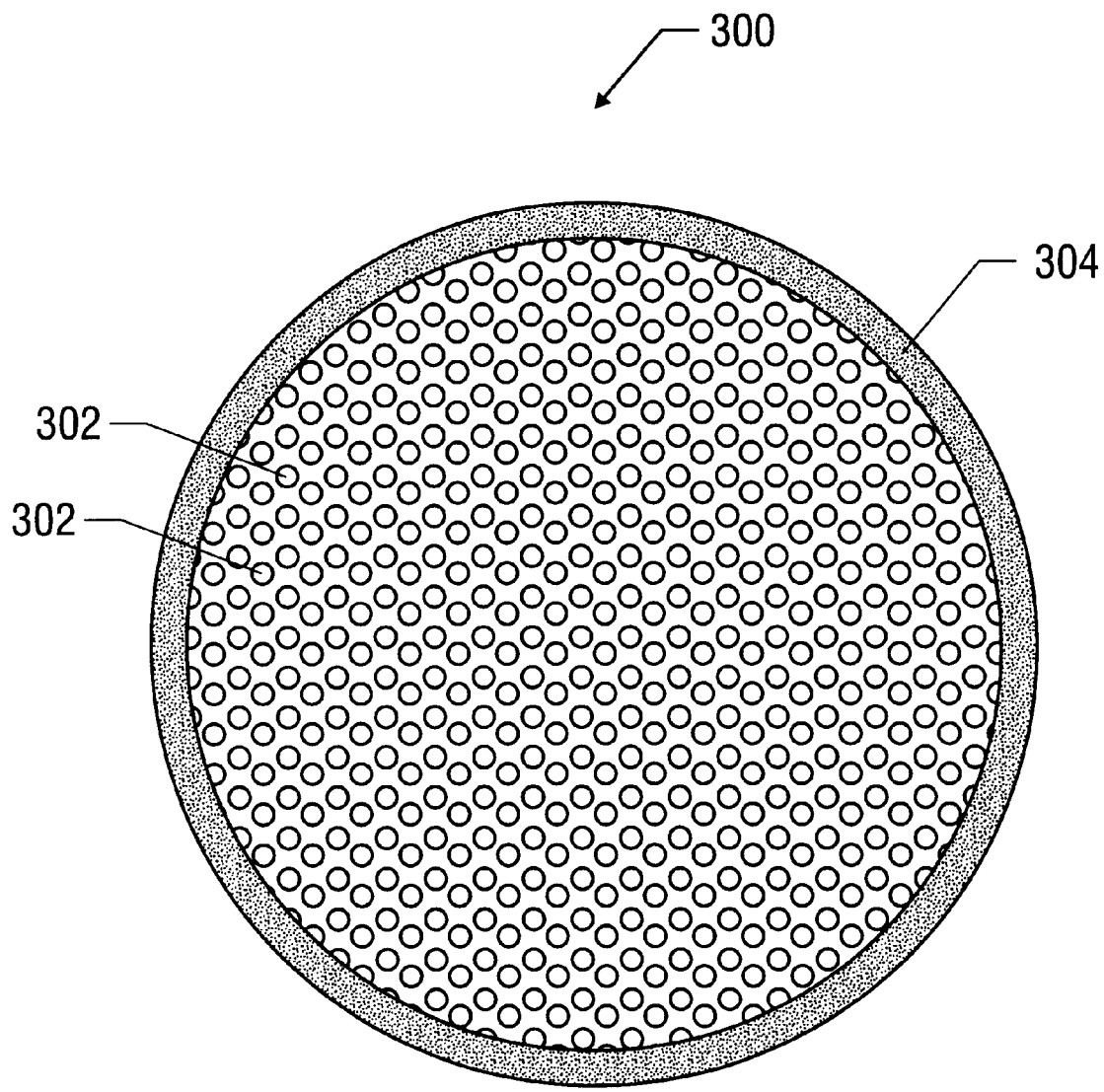
FIG. 30 is a representation of an agglomerated deformable beaded particle including substantially non-deformable components surrounded and intermixed with a coat of substantially deformable material according to one embodiment of the disclosed method.

In still another embodiment of the disclosed method, agglomerated multi-component deformable particles may be employed. Such agglomerates may comprise one or more relatively hard or substantially non-deformable materials mixed or agglomerated with one or more relatively elastic or substantially deformable materials. One example of such a particle 300 is illustrated in cross-section in FIG. 30. An agglomerated multi-component deformable particle 300 may comprise one or more substantially non-deformable material components 302, such as one or more materials selected from the substantially non-deformable materials described elsewhere herein as suitable for a core material of a layered deformable particle. Such substantially non-deformable material components 302 may be coated with or otherwise intermixed with substantially deformable material 304 so that the deformable material 304 functions to at least partially coat and/or fill pore spaces existing between individual non-deformable material components 302 as shown in FIG. 30. An outer layer of deformable material 304 may be present as shown in FIG. 30, although this is not necessary. The deformable component/s 304 of such an agglomerated multi-component deformable particle 300 may comprise any suitable substantially deformable materials, such as one or more materials selected from the substantially deformable materials described elsewhere herein as suitable for use in single component and/or layered deformable particles.

In one embodiment of agglomerated multi-component material, substantially non-deformable material may be any substantially non-deformable granular material less than about 100 microns in size, and substantially deformable material may be any substantially deformable material suitable for encapsulating the substantially non-deformable material in a matrix. Specific examples of substantially non-deformable material employed in this embodiment include, but are not limited to, at least one of silica, cristobalite, graphite, gypsum, talc, or a mixture thereof, and specific examples of substantially deformable material employed in the same embodiment include, but are not limited to, resins such at least one of furan, furfuryl, phenol formaldehyde, phenolic epoxy, or a mixture thereof. It will be understood with benefit of this disclosure by those of skill in the art that whenever resins are utilized as substantially deformable material in the practice of any of the embodiments of the disclosed method that they may be chemically modified, such as by inclusion of suitable plasticizers, to render the resin/s suitably deformable for individual applications. In this regard, plasticizer may be incorporated in all or a portion of the deformable material content of each particle. For example, a plasticizer may be incorporated into only an outer layer of an agglomerate particle, or alternatively throughout all of the deformable material of the agglomerate particle.

It will be understood with benefit of this disclosure by those of skill in the art that the amount of deformable material relative to amount of substantially non-deformable material may be varied to change or modify the deformation characteristics of an agglomerated multi-component particle. In this regard, the amount of deformable material in such an agglomerated particle may vary from just greater than about 0% to just less than about 100% by weight of the particle. However, in one embodiment an agglomerated deformable particle comprises from about 5% to about 50%, alternatively from about 5% to about 25%, and in a further alternative from about 10% to about 20% by weight of substantially deformable material/s, with the balance of the particle being composed of substantially non-deformable material/s. For example substantially deformable material may make up between about 5% and about 50% by volume of the total volume of an agglomerated particle, and substantially non-deformable material may make up between about 50% and about 95% by volume of the total volume of the agglomerated particle.

In one exemplary embodiment, an agglomerated multi-component particle may comprise an agglomerated mixture of silica and resin. In this embodiment, a resin component may comprise any resin suitable for encapsulating the silica, including, but not limited to, epoxy resins, furan, phenol formaldehyde, phenolic epoxy, etc. Most typically, such a particle comprises about 10.5% by weight of phenolic resin mixed with particles of silica having a size of from about 6 to about 100 microns.

Whether agglomerated, layered or in other form, multi-component deformable particles may be employed in any of the shapes and sizes described elsewhere herein as being suitable for other forms or embodiments of deformable particles. Moreover, such particles may be employed alone as a fracture proppant, or in mixtures in amounts and with types of fracture proppant materials as described elsewhere herein for other types of deformable particles. It will also be understood with benefit of this disclosure by those of skill in the art that selection of multi-component deformable particle characteristics may be made based on anticipated formation conditions such as formation temperature and/or formation closure stress. Such characteristics include, but are not limited to, core and layer materials of a layered deformable particle, layer and core thicknesses of a layered deformable particle, types and relative percentages of deformable and non-deformable materials employed in an agglomerated multi-component particle, etc.

EXAMPLES

The following examples are illustrative and should not be construed as limiting the scope of the invention or claims thereof.

Examples 1–3

Plastic Beads

Polystyrene divinylbenzene copolymer plastic beads with a 20/40 mesh size were tested alone (without other proppant materials) using modified API standards. These beads contained about 4% divinylbenzene by weight. These plastic beads used in this example were found to pass the standard API RP 56 test for roundness, sphericity, and acid solubility (i.e., 0.5%). Testing was also performed to determine if any swelling in solvents occurred. The beads were placed in xylene at room temperature and photographed over 65 hours. No swelling occurred under these conditions. Standard API crush testing was also performed on the beads at stresses between 2000 and 8000 psi. It was found that plastic beads of this type typically do not fracture or shatter in a brittle manner to generate fines under stress, but instead "plastically" deform to form flat dimples on the round surface. Consequently, non-API tests were performed to determine the crush properties of the beads.

Example 1

API RP 56 Evaluation

The polystyrene divinylbenzene plastic beads of this embodiment had a sphericity of 0.9 and roundness of 0.9 which is suitable for proppant use since it meets the required minimum value of 0.6 for each property. A sieve analysis of the material contained an acceptable 93.8% 20/40 distribution with 6.1% retained on the 50 mesh screen and 0.1% fines. The acid solubility at 150° F. was an acceptable 0.5% using a 12-3 HCl-HF acid.

Example 2

API Crush Testing

To measure propensity of polystyrene divinylbenzene plastic beads of this embodiment to generate fines under closure stress, the plastic beads were crush tested at confining stresses of 2000, 4000, 6000 and 8000 psi using Equation 7.1 in API RP 60. An initial starting mass of 15.71 gm for a measured bulk density of 0.636 gm/cm$^3$ using a 2 inch diameter crush cell was calculated. The results of the crush test are given in Table II where the weight percent of fines are given for an initial 6.2% "fines" distribution material at zero stress. The third column estimates the fines less than 50 mesh by subtracting the initial 6.1% 50 mesh particles.

TABLE II

| Weight Per Cent Fines for Plastic Bead Crush Tests | | |
|---|---|---|
| Crush Stress (psi) | Fines (wt %) | Fines (Less Than 50 Mesh) (wt %) |
| 0 | 6.2 | 0.1 |
| 2000 | 6.9 | 0.7 |
| 4000 | 6.9 | 0.7 |
| 8000 | 5.0 | * |

The results given in Table II indicate that the plastic particles are "crush resistant" since the percentage of fines are less than 14% at all stress levels.

Example 3

Non-API Crush Testing

To measure deformation properties of the polystyrene divinylbenzene beads of this embodiment, the plastic bead material was slowly (i.e., 2 minutes) stressed in a 1-inch diameter cell by computer control of the measured load while accurately monitoring the change in sample volume by using a sensitive linear variable differential transducer (LVDT) calibrated to 0.001 inch accuracy.

Figure 11:
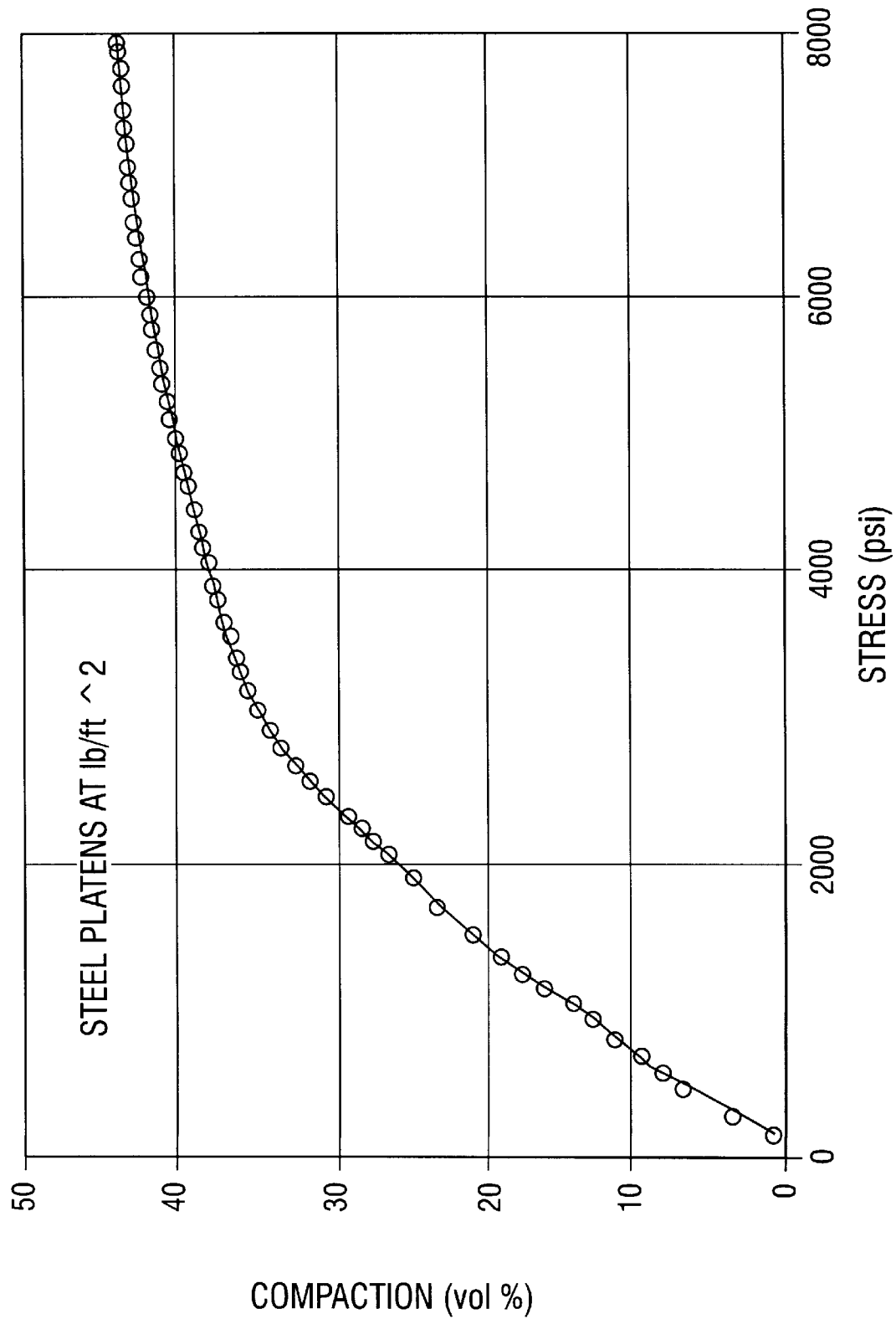
FIG. 11 illustrates volume compaction versus closure stress for polystyrene divinylbenzene plastic beads.
Figure 12:
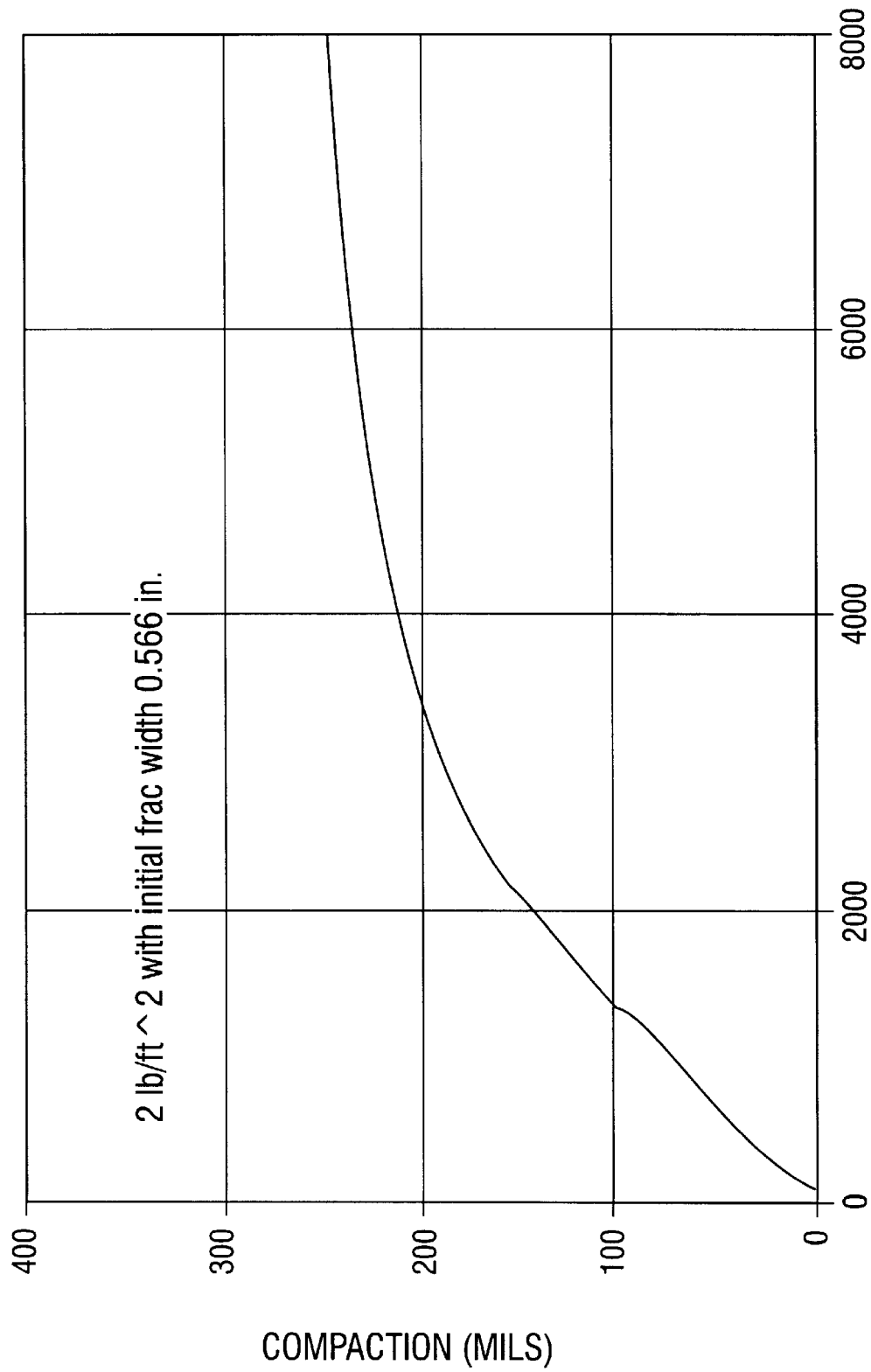
FIG. 12 illustrates linear compaction versus closure stress for polystyrene divinylbenzene plastic beads.
Figure 13:
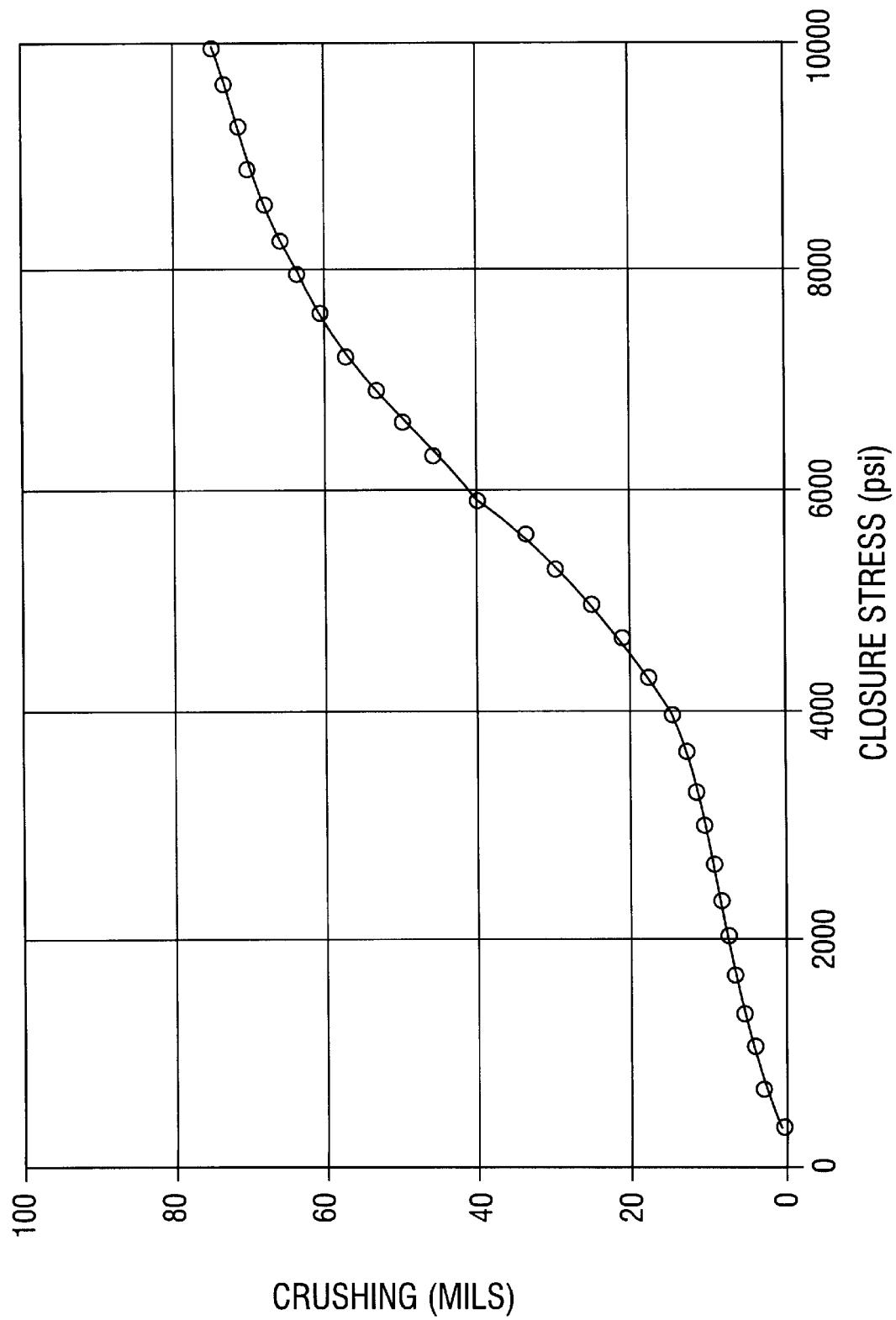
FIG. 13 illustrates linear compaction versus closure stress for 20/40 mesh Ottawa sand at a pack density of 2 lb/ft$^2$.

In FIG. 11, volume percent change in plastic beads is plotted as a function of closure stress. At 2000 psi closure stress, 25% of the bulk bead volume has been lost due to pore volume changes. At 6000 psi closure stress, essentially all of the pore volume is lost (i.e., 42%) due to compaction, and the beads are essentially a conglomerate solid. This large compaction of plastic beads is shown in FIG. 12 where the change in fracture width is plotted versus stress. The change in fracture width is measured in the English unit mils (i.e., 1 mil=0.001 inches). For comparison, the same measurements are shown in FIG. 13 for 20/40 mesh Ottawa sand proppant at 2 lb/ft². At 4000 psi closure stress, the plastic beads are compacted 210 mils. Ottawa sand is compacted only 17 mils. The data in FIGS. 12 and 13 indicate that the compaction of plastic beads are a factor of 12 times larger than the compaction of Ottawa sand. For Ottawa sand, proppant crushing starts at about 4500 psi and increases significantly for stress greater than 6000 psi.

Examples 4–9

Plastic Bead/Ottawa Sand Mixtures

Conductivity analyses were performed on combinations of plastic beads and Ottawa sand at 200° F. Results of these analyses are presented in Tables III and IV, and graphically in FIGS. 14 and 15.

Example 4

Conductivity Testing

Conductivity tests were performed on a combination of 20/40 mesh polystyrene divinylbenzene plastic beads and combinations of 20/40 mesh Ottawa sand and 20/40 mesh polystyrene divinylbenzene plastic beads according to the present embodiment. Tests were performed using a "DAKE" hydraulic press having a "ROSEMOUNT" differential transducer (#3051C) and controlled by a "CAMILE" controller. Also employed in the testing was a "CONSTAMETRIC 3200" constant rate pump. In addition to testing 20/40 plastic beads alone, a 7:1 mixture of 1.75 lbs/ft² of 20/40 mesh Ottawa sand to 0.25 lbs/ft² of 20/40 mesh plastic beads, and a 3:1 mixture of 1.50 lbs/ft² of 20/40 mesh Ottawa sand to 0.50 lbs/ft² of 20/40 mesh plastic beads were also tested. Averaged test results are given in Tables III and IV, as well as is FIGS. 14 and 15. For comparison purposes, conductivity and permeability data for 20/40 Ottawa sand published by "STIMLAB" is also presented.

As shown in Tables III and IV, test results indicate that combinations of plastic beads and Ottawa sand according to this embodiment of the disclosed method may have a positive synergistic effect on permeability and conductivity.

TABLE III

Permeability at Varying Closure Stresses

| Closure Stress (psi) | Permeability, Darcies | | | |
|---|---|---|---|---|
| | 20/40 Mesh Ottawa Sand | 20/40 Mesh Plastic Beads | 3:1 Combination | 7:1 Combination |
| 1000 | 277 | 235 | 356 | |
| 2000 | 248 | 99 | 272 | 262 |
| 4000 | 142 | | 189 | 143 |
| 6000 | 45 | | 120 | 52 |
| 8000 | 16 | | 55 | 17 |
| 10000 | 9 | | 36 | |

TABLE IV

Conductivity at Varying Closure Stresses

| Closure Stress (psi) | Conductivity, md-ft | | | |
|---|---|---|---|---|
| | 20/40 Mesh Ottawa Sand | 20/40 Mesh Plastic Beads | 3:1 Combination | 7:1 Combination |
| 1000 | 5135 | 7110 | 8355 | |
| 2000 | 4340 | 3260 | 5778 | 5424 |
| 4000 | 2640 | | 3013 | 2811 |
| 6000 | 1178 | | 1310 | 977 |
| 8000 | 292 | | 976 | 295 |
| 10000 | 164 | | 639 | |

Figure 14:
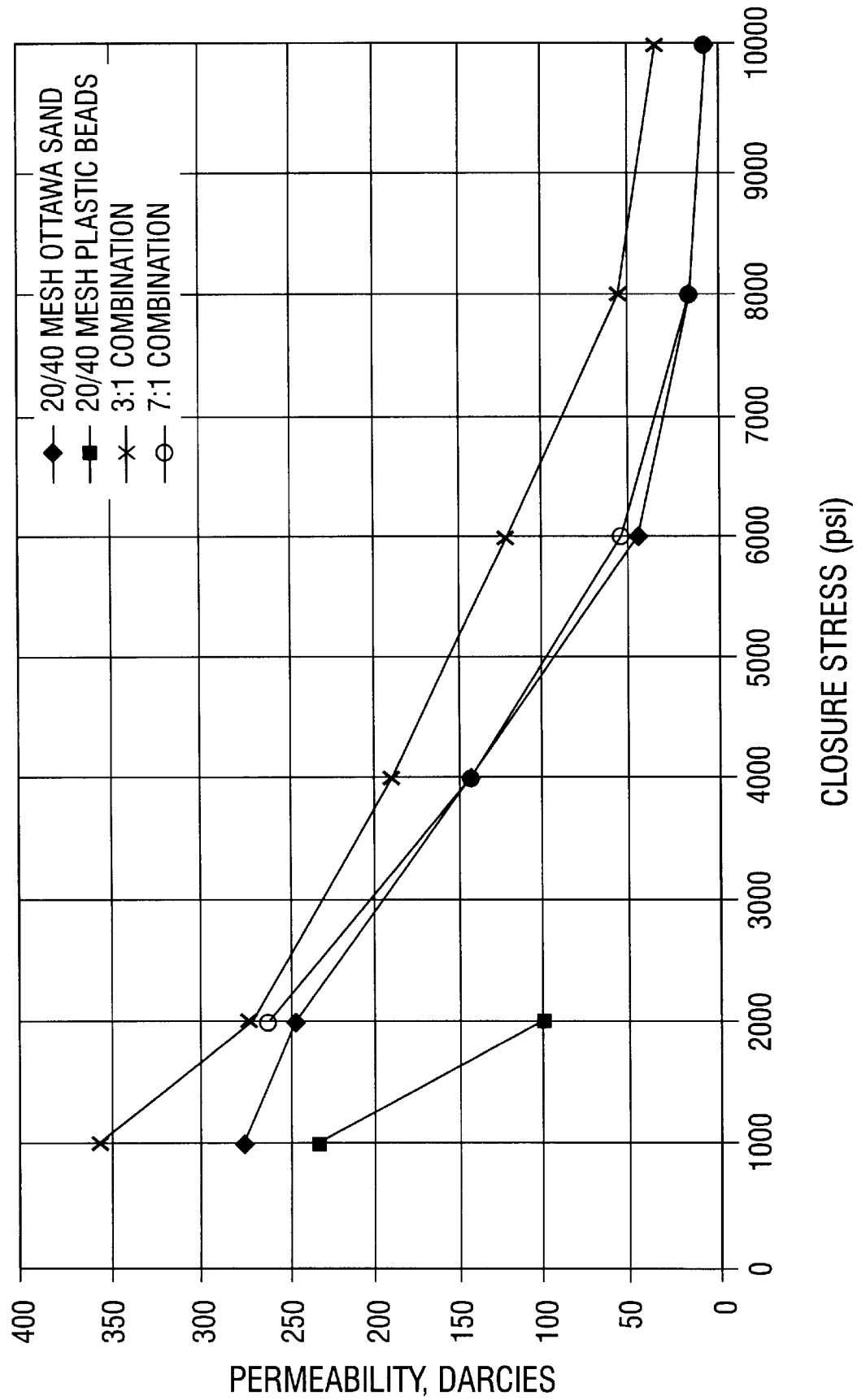
FIG. 14 illustrates permeability versus closure stress for plastic beads, 20/40 mesh Ottawa sand, and 3:1 and 7:1 mixtures by volume of 20/40 plastic beads and 20/40 mesh Ottawa sand according to embodiments of the disclosed method.

As shown in Table III and FIG. 14, at a 3:1 mixture of 1.50 lbs/ft² of 20/40 mesh Ottawa sand to 0.50 lbs/ft² of plastic beads there was a consistent increase in permeability over 20/40 Ottawa proppant alone. At 2000 psi closure the increase in mixture permeability over Ottawa sand was approximately 10% (from about 250 darcy to about 270 darcy), at 4000 psi the increase was approximately 35% (from about 140 darcy to about 190 darcy), and at 8000 psi, the increase was approximately 240% (from about 16 darcy to about 55 darcy). Significantly, at 10,000 psi closure stress, the about 36 darcy permeability of the 3:1 combination is approximately 300% greater than the about 9 darcies permeability of Ottawa sand alone. Among other things, this test demonstrated the ability of the beads to reduce the production of fines by Ottawa at higher closures stresses by preventing grain to grain contact between grains of proppant.

Figure 15:
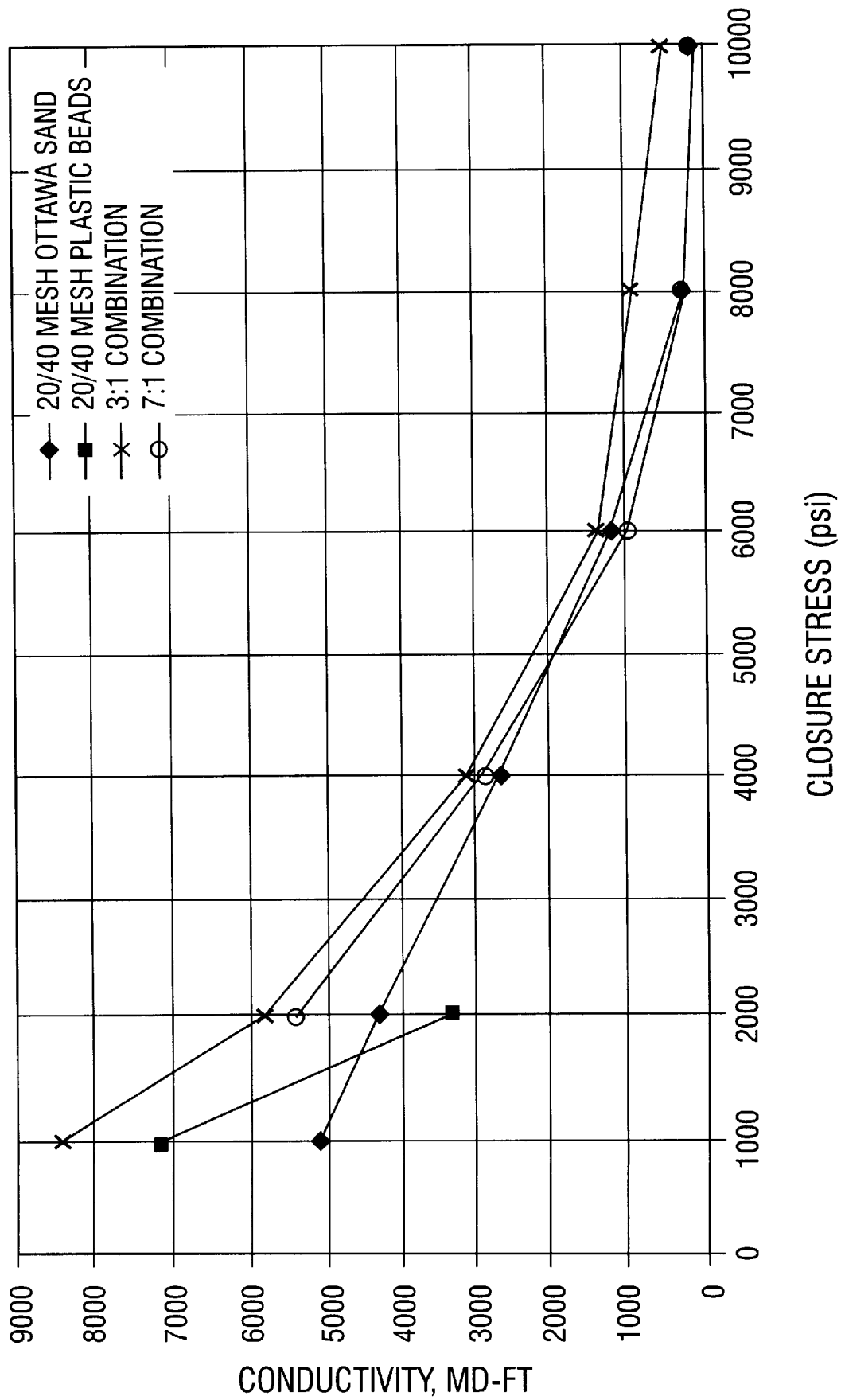
FIG. 15 illustrates conductivity versus closure stress for 20/40 mesh Ottawa sand, 20/40 mesh plastic beads, and 3:1 and 7:1 mixtures by volume of 20/40 mesh Ottawa sand and 20/40 mesh plastic beads according to one embodiment of the disclosed method.

It may also be seen in Table III and FIG. 14 that at 200° F. a 7:1 mixture of 1.75 lbs/ft² of 20/40 mesh Ottawa sand to 0.25 lbs/ft² plastic beads yields permeability values closer to those of Ottawa sand alone than does a 3:1 mixture. However, Table IV and FIG. 15 show that the 7:1 mixture yielded increased conductivity values over Ottawa sand for all but the 6000 psi test closure stress. Furthermore, for temperatures below 200° F., greater permeability and conductivity improvements may be expected with a 7:1 mixture. It will also be understood with benefit of the present disclosure that mixtures of deformable particulate material and fracture proppant according to the disclosed method may be used to successfully reduce fines generation and/or proppant flowback independent of, or without, any associated permeability or conductivity improvement over fracture proppant alone.

Referring again to FIG. 11, deformation tests demonstrated that a deformable particulate, in this embodiment a polystyrene divinylbenzene bead of 20/40 U.S. Mesh size and containing about 4% divinylbenzene by weight, deforms to consume approximately 33% of the existing pore space at 1000 psi closure stress. At 2000 psi closure approximately 55% deformation had occurred and at 8000 psi the pore space was essentially nil. However, as shown in FIG. 15, when 20/40 mesh polystyrene divinylbenzene beads of this embodiment are combined with 20/40 mesh Ottawa fracturing sand in a 3:1 ratio by volume, conductivity at all stress values listed above is greater than either proppant alone. At 1000 psi closure stress the 3:1 mixture had a conductivity of approximately 8355 md-ft while the conductivity of 20/40 mesh Ottawa proppant alone is 5135 md-ft and conductivity of polystyrene divinylbenzene beads alone was found to be 7110 md-ft. At 2000 psi closure stress the conductivity values are 5778 md-ft for the 3:1 mixture, 4340 md-ft for the 20/40 mesh Ottawa sand, and 3260 md-ft for the plastic beads. At 6000 psi the 3:1 mixture gave 1310 md-ft while 20/40 mesh Ottawa sand alone has a conductivity of 1178 md-ft. In FIG. 15, a similar effect may be observed for the 7:1 mixture.

Example 5

Crush Testing

Figure 16:
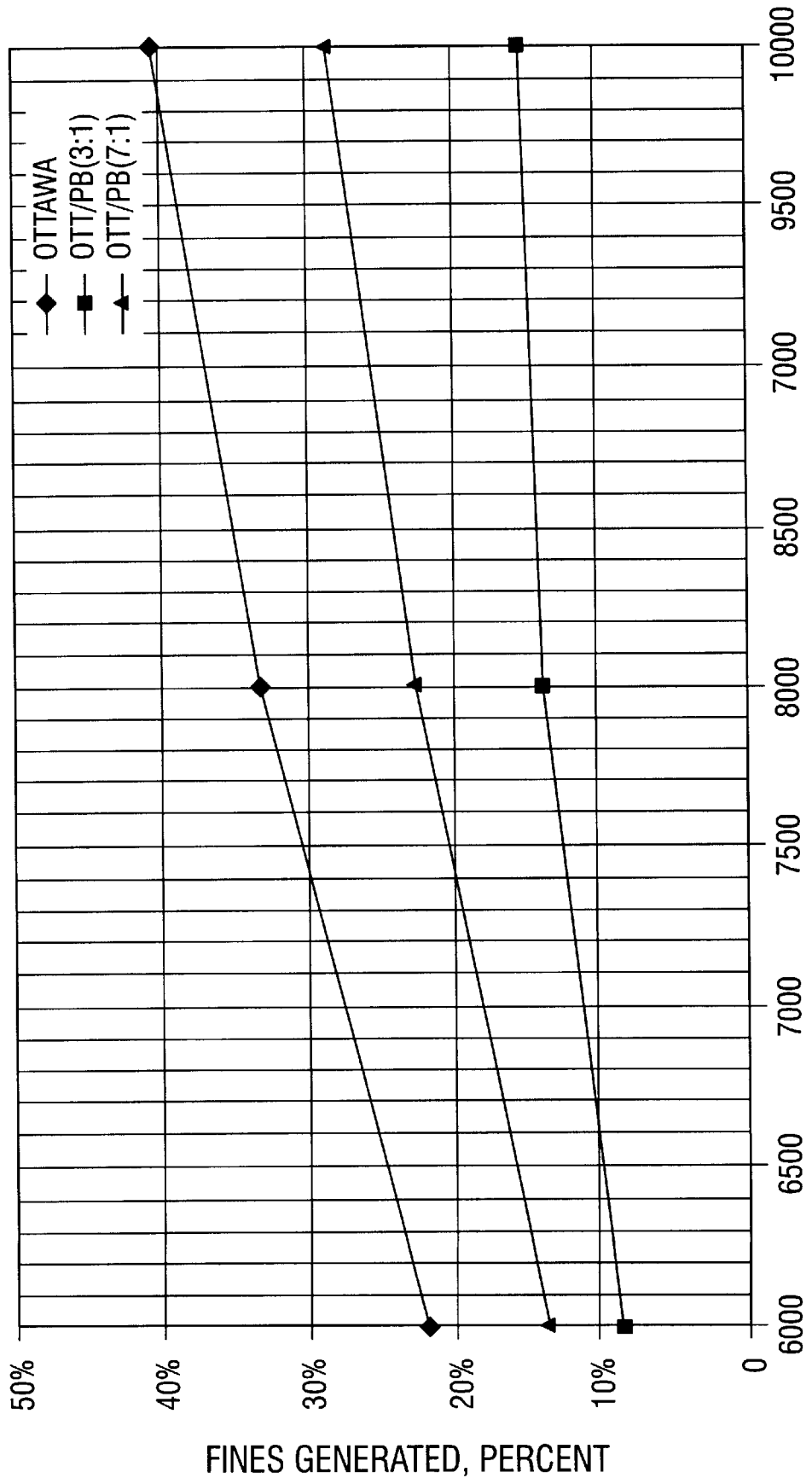
FIG. 16 illustrates fines generation versus closure stress for 20/40 mesh Ottawa sand and 3:1 and 7:1 mixtures of 20/40 mesh Ottawa sand and 20/40 mesh plastic beads according to embodiments of the disclosed method.

Reduction in fines generation using embodiments of the disclosed method is evidenced in crush tests performed on 3:1 and 7:1 by volume mixtures of 20/40 mesh Ottawa sand and the polystyrene divinylbenzene beads of the present embodiment. As shown in FIG. 16, the fines generated as a percentage of proppant (20/40 mesh Ottawa) decreases with increasing concentration of deformable plastic material. For example, at 6,000 psi closure stress, 22% fines were generated by 20/40 mesh Ottawa sand above. This level of fines generation is above the API recommended maximum fines generation of 14% for proppant applications. For a 7:1 ratio of 20/40 mesh Ottawa sand to 20/40 mesh polystyrene divinylbenzene beads, approximately 13% fines were generated. For a 3:1 ratio of 20/40 mesh Ottawa sand to 20/40 mesh polystyrene divinylbenzene beads (4% divinylbenzene) only about 8% fines were generated. These levels of fines generation are well below the API recommended maximum.

As seen in FIG. 16, percentage reduction in fines for 20/40 mesh Ottawa sand/20/40 mesh polystyrene divinylbenzene bead mixtures was even greater at higher closure stresses. For example, at 8,000 psi closure stress, approximately 33% fines were generated for 20/40 mesh Ottawa sand alone, 22% fines for a 7:1 mixture and 13% fines for a 3:1 mixture. At 10,000 psi closure stress, 40% fines were produced for 20/40 mesh Ottawa sand, 29% for a 7:1 mixture and 15% for a 3:1 mixture. Significantly, the level of fines generation for the 3:1 mixture remained 20%, even at 10,000 psi closure stress.

These test results indicate that the fines reduction advantages of the disclosed method may be realized under a wide variety of closure stress conditions. These results also demonstrate that the useable range of fracture proppant materials, such as Ottawa sand, may be extended to higher stress levels using deformable particles of the disclosed method.

Example 6

Packing Geometries

Figure 17:
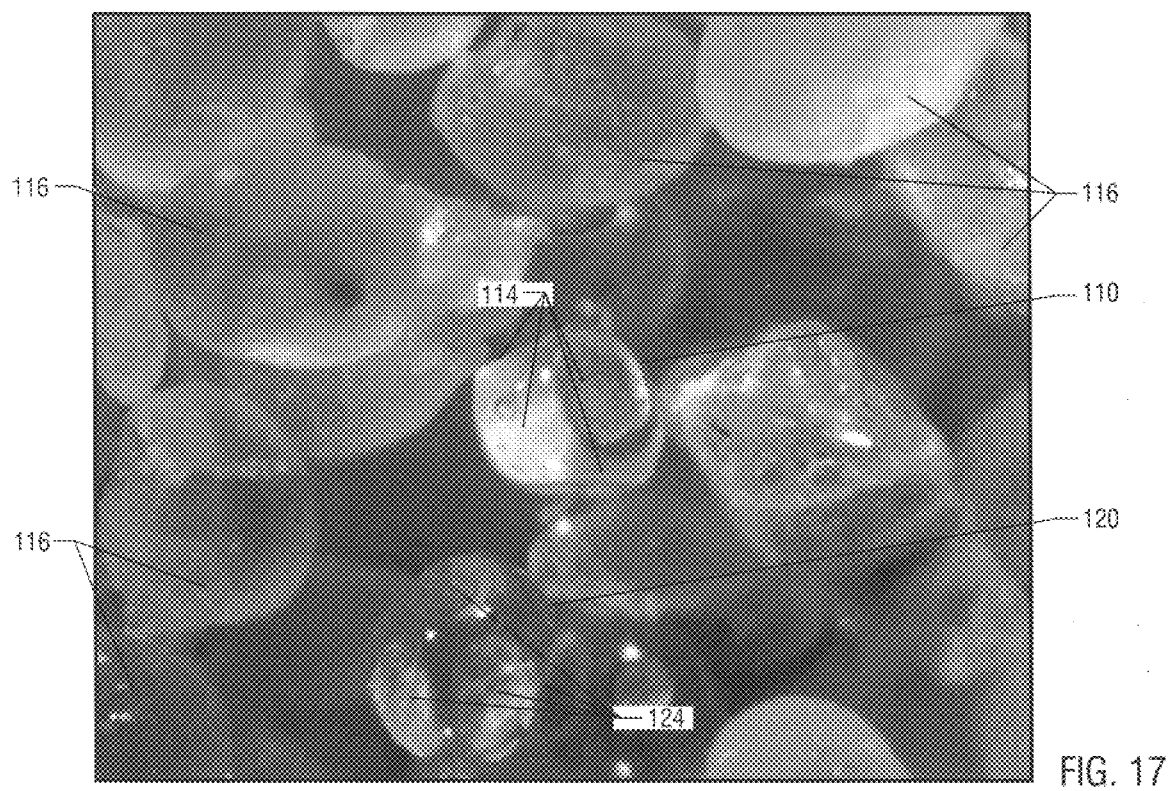
FIG. 17 illustrates three dimensional deformation of polystyrene divinylbenzene particles after being subjected to stress in a simulated fracture proppant pack.
Figure 18:
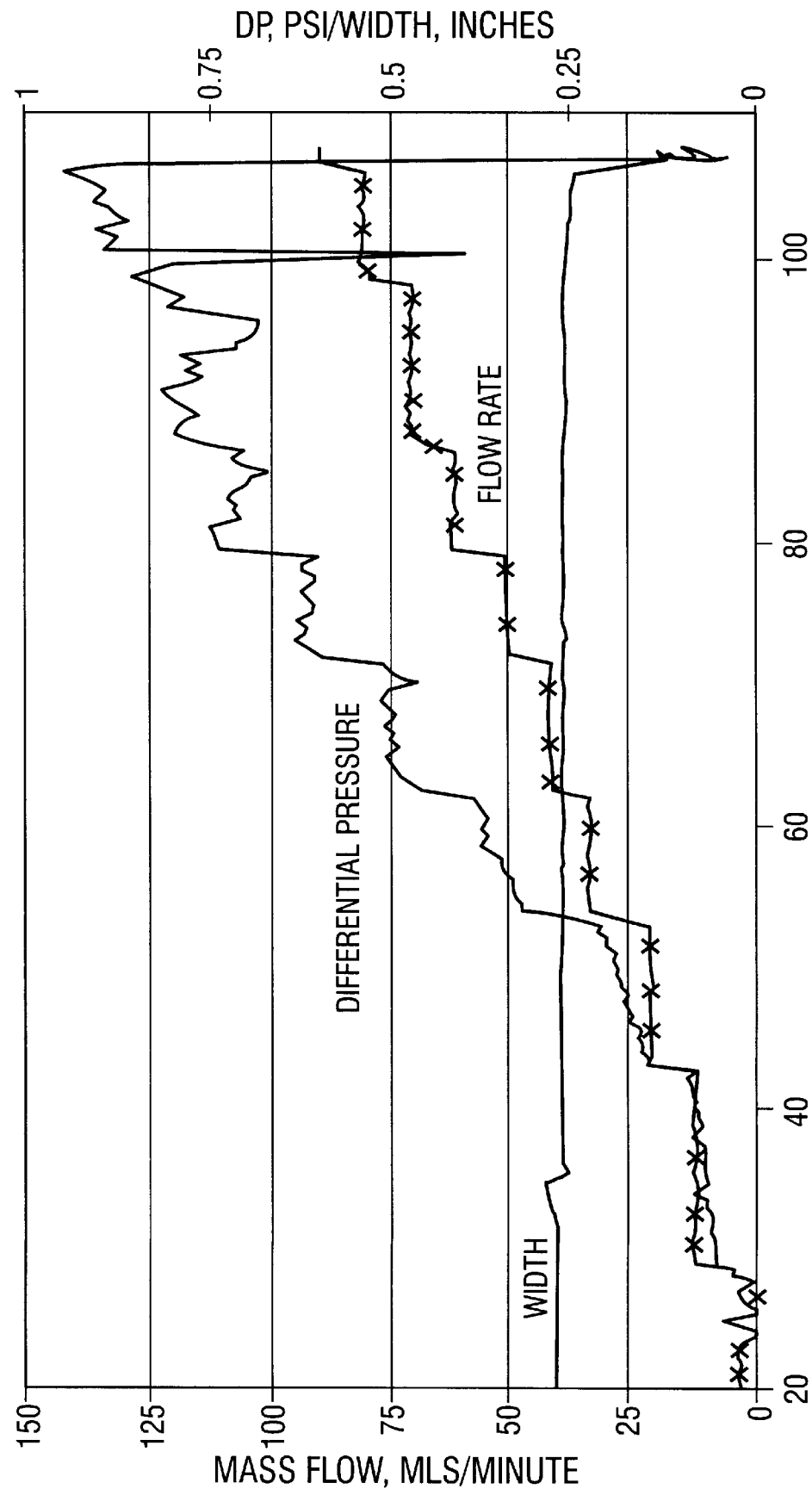
FIG. 18 illustrates the flowback failure of an Ottawa sand proppant pack under a closure stress of greater than 1000 psi.
Figure 19:
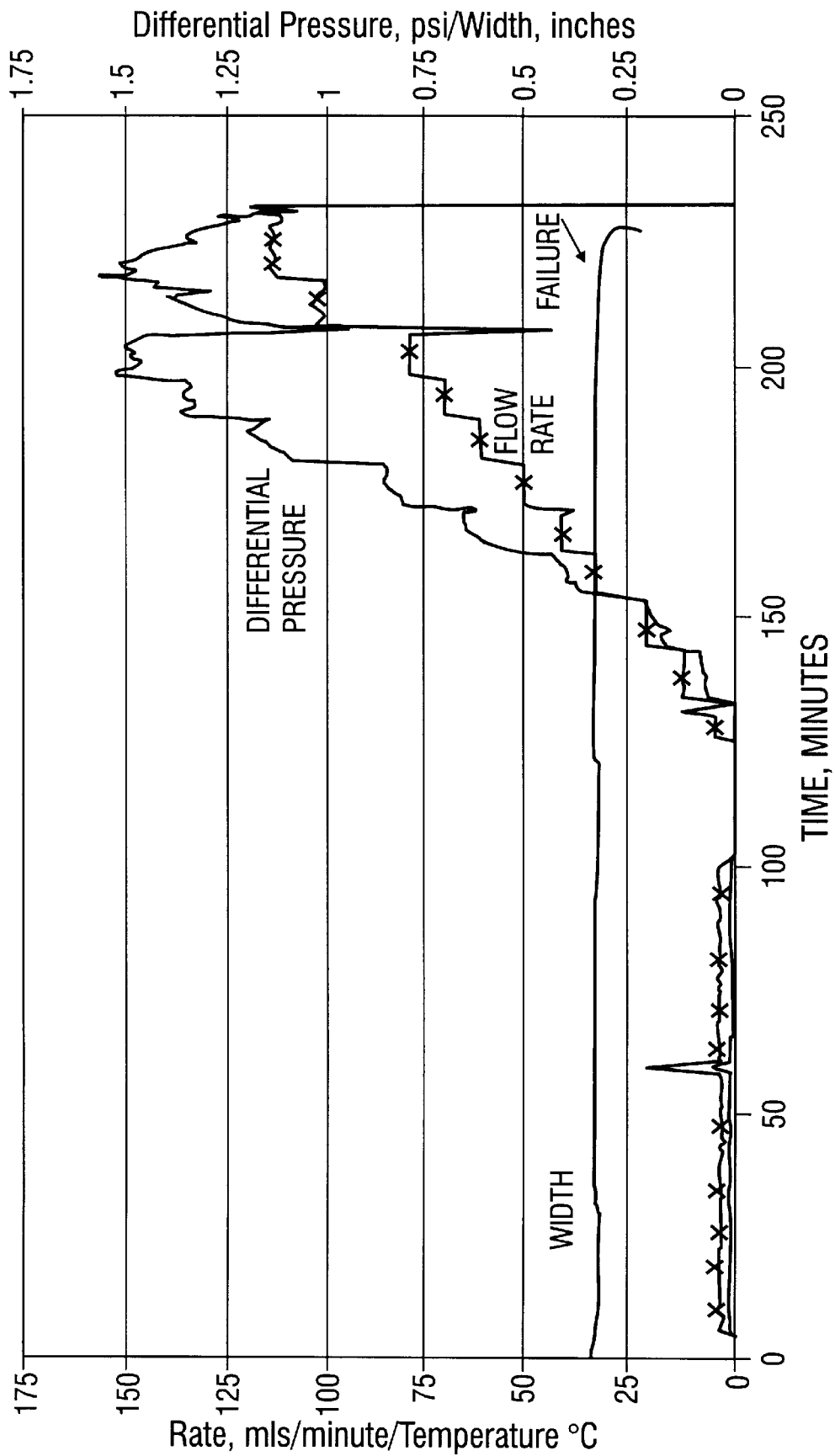
FIG. 19 illustrates the flowback failure of a proppant pack containing a 3:1 mixture of Ottawa sand to polystyrene divinylbenzene plastic beads under a closure stress of greater than 1000 psi.
Figure 20:
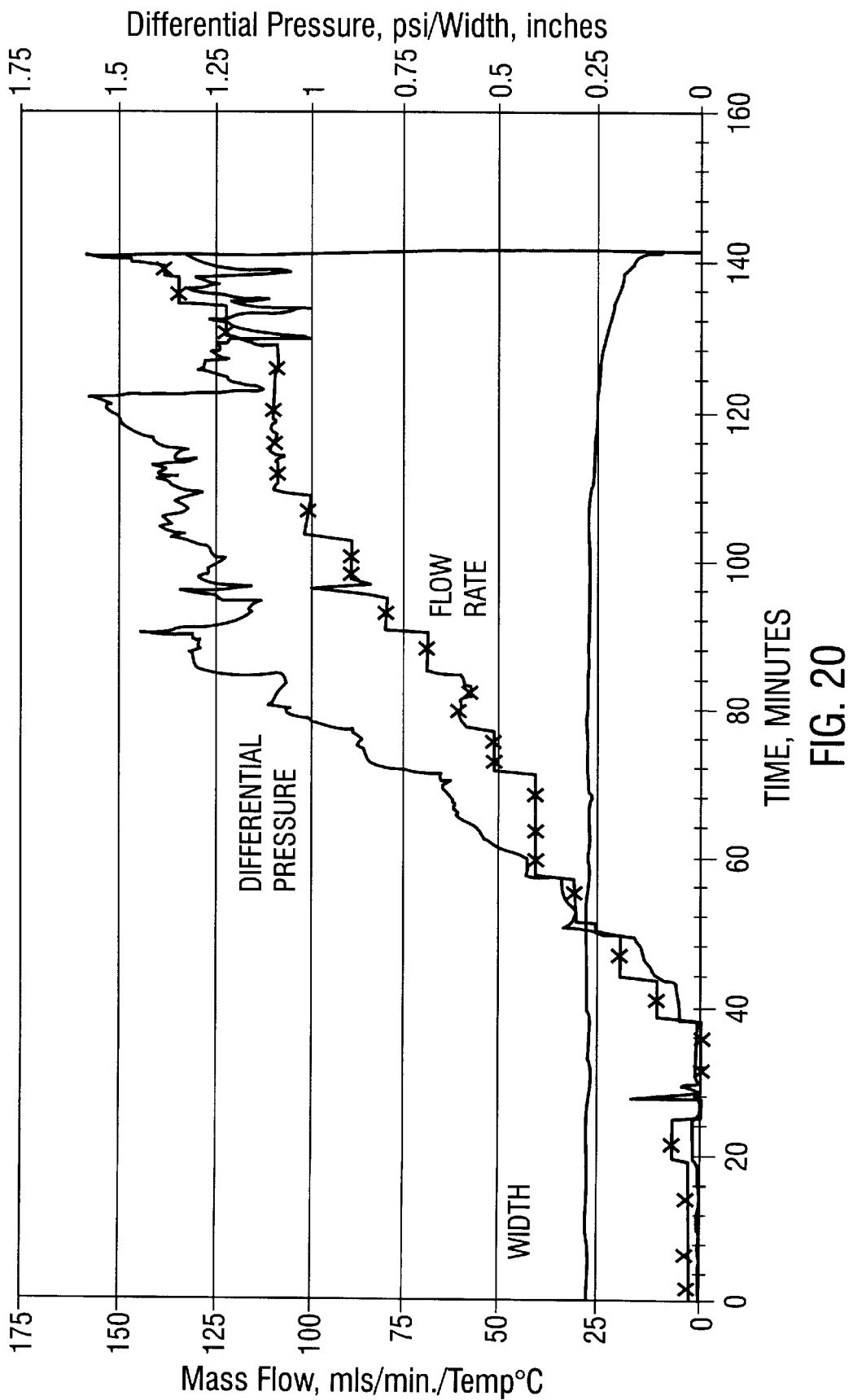
FIG. 20 illustrates the flowback failure of a proppant pack containing a 4:1 mixture of Ottawa sand to polystyrene divinylbenzene plastic beads under a closure stress of greater than 1000 psi.
Figure 21:
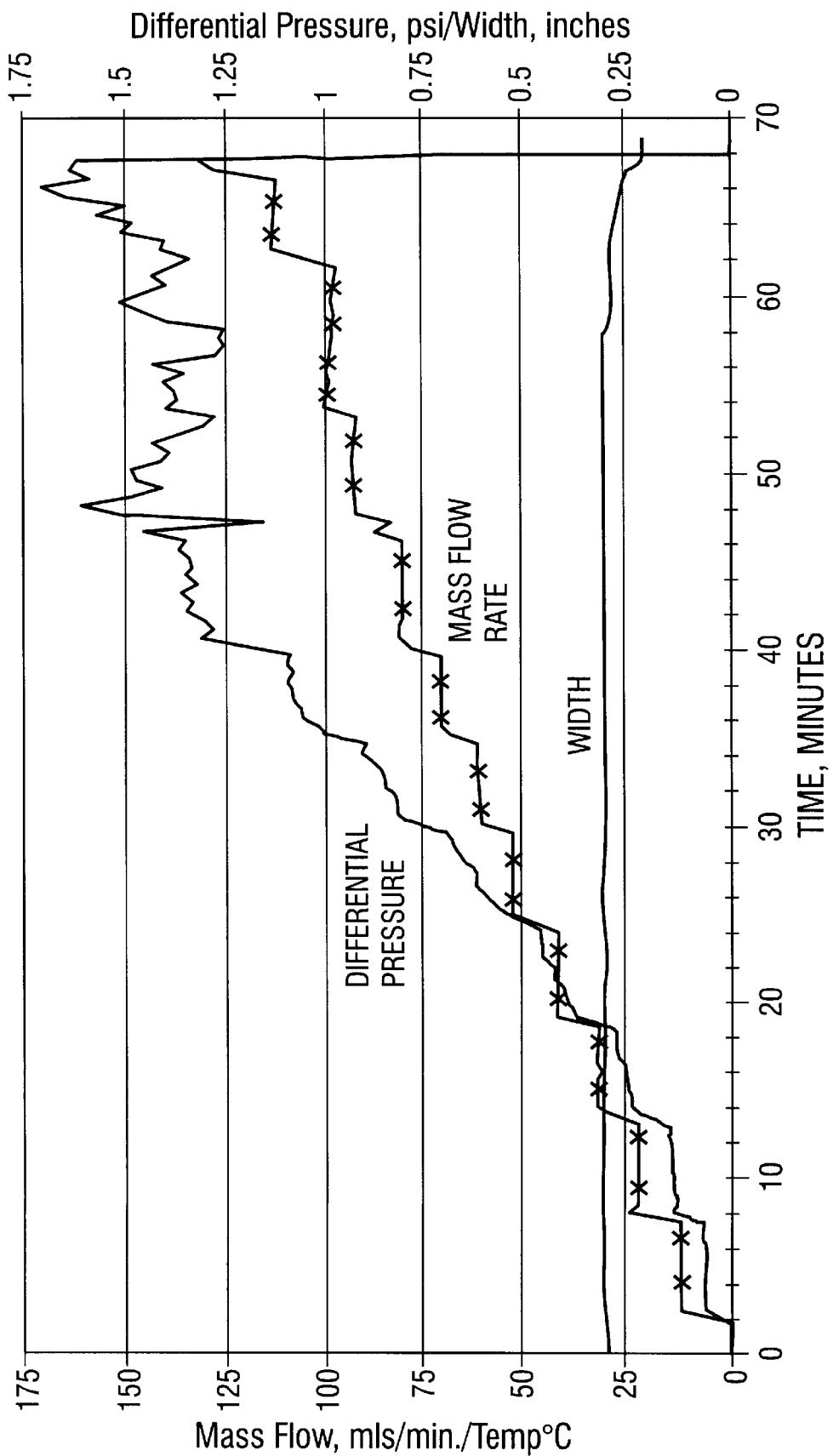
FIG. 21 illustrates the flowback failure of a proppant pack containing a 5.7:1 mixture of Ottawa sand to polystyrene divinylbenzene plastic beads under a closure stress of greater than 1000 psi.

Referring to FIG. 17, photographs of polystyrene divinylbenzene beads obtained from a stereo microscope are shown. These beads were mixed with an Ottawa sand fracture proppant at a ratio of 3:1 to form a simulated proppant pack, and then subjected to a stress of 10,000 psi. Stress was then relieved and the deformed polystyrene divinylbenzene beads photographed. As shown in FIG. 17, three dimensional structures were formed under stress between deformable polystyrene divinylbenzene beads 110 and 120 and fracture proppant particles 116, leaving dimpled surfaces 114 and 124 on sides of beads 110 and 120, respectively, without sticking or adherence of the beads 110 and 120 to the fracture proppant particles 116. The results of this example indicate that embodiments of the disclosed method achieve three dimensional multi-planar structures when subjected to formation stress.

Example 7

Flowback Tests

Proppant flowback failure was determined for Ottawa sand and mixtures of Ottawa sand to polystyrene divinylbenzene beads ranging from about 3:1 to about 6:1. For comparison purposes, proppant flowback failure was also determined for Ottawa sand alone. The polystyrene divinylbenzene beads employed for these tests contained about 0.5% divinylbenzene crosslinker by weight, had a Young's confined modulus of about 50,000 psi, and had a size of about 20 mesh.

The proppant samples were loaded into a standard conductivity cell at 2 lbs/ft$^2$. The width of the pack was measured throughout the test using an LVDT. The differential pressure between the input and output flow of water through the pack was measured employing a Rosemount PD transducer and the rate of the flow was measured by a Micromotion D6 mass flow meter. Closure stress (approximately 1000 psi) was applied to the pack. The end of the conductivity cell was then removed to expose the proppant pack and replaced with a lexan tube filled with water. This allowed sand to flow into the tube at failure. Water was then pumped through the pack at flow rates increasing incrementally by 10 ml/minute intervals until pack failure which was judged by width of the pack and the loss of differential pressure. The temperature of the water flowing into the pack and the cell were maintained at between about 64° C. to about 68° C.

As can be seen from FIGS. 18–21, compositions of Ottawa sand/polystyrene divinylbenzene bead mixtures (FIGS. 19–21) failed at flow rates of greater than approximately 110 ml/min while the Ottawa sand composition failed at flow rates of from about 60 to 80 ml/min. Thus, the present invention allows for a significant improvement (approximately 150%) in the stability of the pack while still improving the conductivity at a closure stress of about 1000 psi.

Example 8

Resistance to Flowback

Resistance to flowback or measure of the force sufficient to move a proppant particle was determined for 20/40 mesh Ottawa sand and mixtures containing 20/40 mesh Ottawa sand and 15% by weight polystyrene divinyl benzene beads using the testing procedure of Example 7. For comparison purposes, resistance to flowback was also determined for 20/40 mesh Ottawa sand alone. The polystyrene divinyl benzene beads employed for these tests contained about 0.5% divinyl benzene crosslinker by weight, had a Young's confined modulus of about 50,000 psi, and had a size of about 20 mesh.

Figure 25:
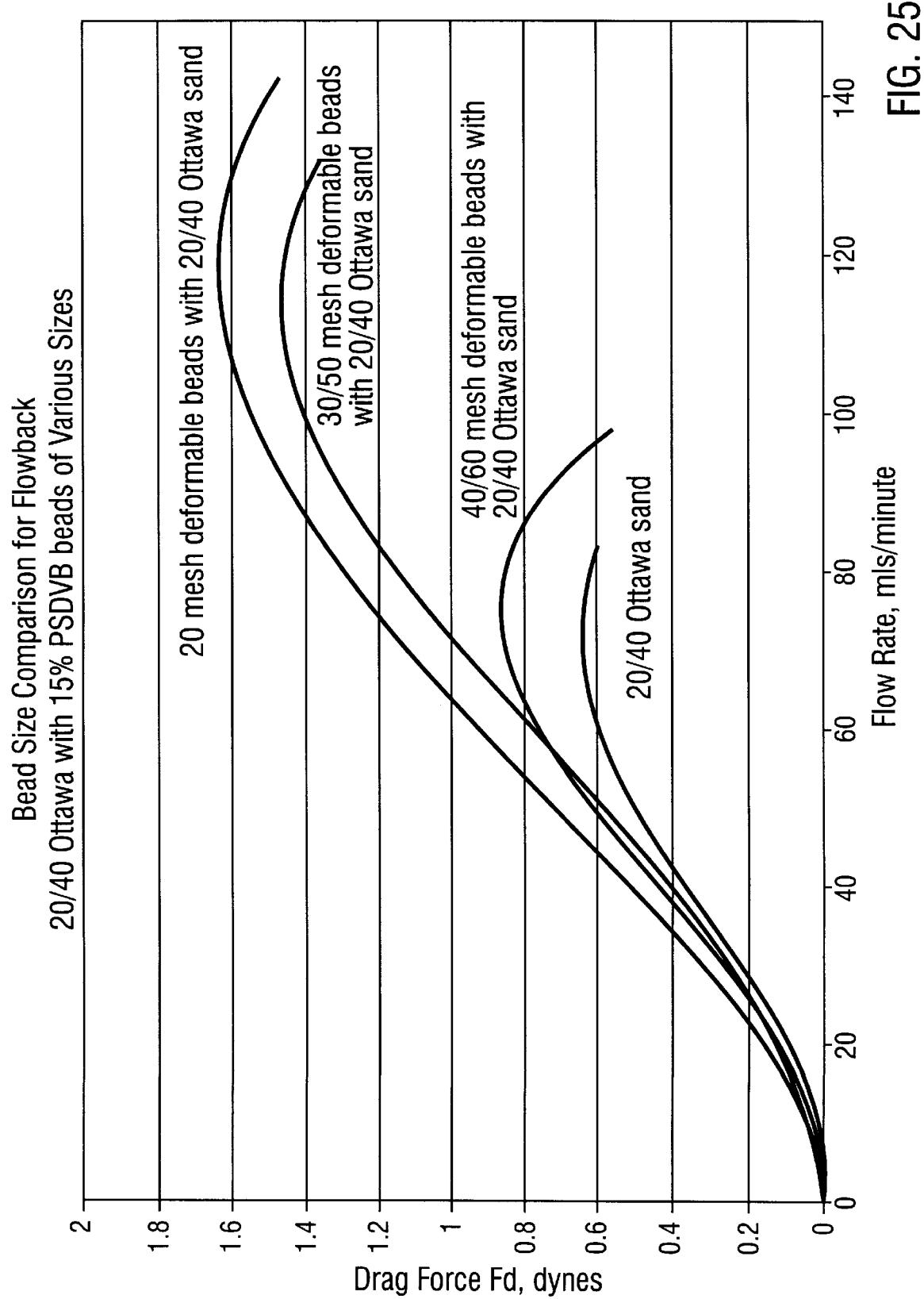
FIG. 25 illustrates drag force versus flow rate for a proppant pack containing 20/40 mesh Ottawa sand and proppant pack mixtures containing 20/40 mesh Ottawa sand and 15% by weight of polystyrene divinyl benzene plastic beads of varying size.

As can be seen in FIG. 25, proppants comprising a mixture of 20/40 Ottawa sand and polystyrene divinyl benzene beads exhibited maximum drag force ("Fd") or resistance to flow of from about 0.85 dynes for a mixture containing 40/60 mesh polystyrene divinyl benzene deformable beads to about 1.65 dynes for a mixture containing 20 mesh polystyrene divinyl benzene deformable beads. Higher maximum drag force values at higher flow rates are an indication of higher resistance to proppant movement for mixtures of deformable beads and sand as compared to sand alone. For example, 20/40 mesh Ottawa sand proppant alone exhibited a maximum drag force of about 0.65 dynes at a flow rate of about 70 ml per minute. In contrast, mixtures of 40/60 mesh, 30/50 mesh, and 20 mesh polystyrene divinyl benzene beads with 20/40 Ottawa sand exhibited maximum drag force values of about 0.85 dynes at about 80 ml per minute, 1.45 dynes at about 110 ml per minute, and about 1.65 dynes at about 120 ml per minute. These results illustrate the relationship between deformable particle size, fracture proppant material size, and the propensity of a fracture pack to produce proppant. In this example, combinations of deformable particles and Ottawa sand produced more stable packs than Ottawa sand alone. Increasing pack stability was also be noted for those combinations in which the size of deformable particles approached the size of the Ottawa sand. In this example, greatest stability of the tested size combinations was noted where the deformable particles had a size (20 mesh) that was as large as the maximum mesh size of the Ottawa sand (20/40 mesh).

Figure 22:
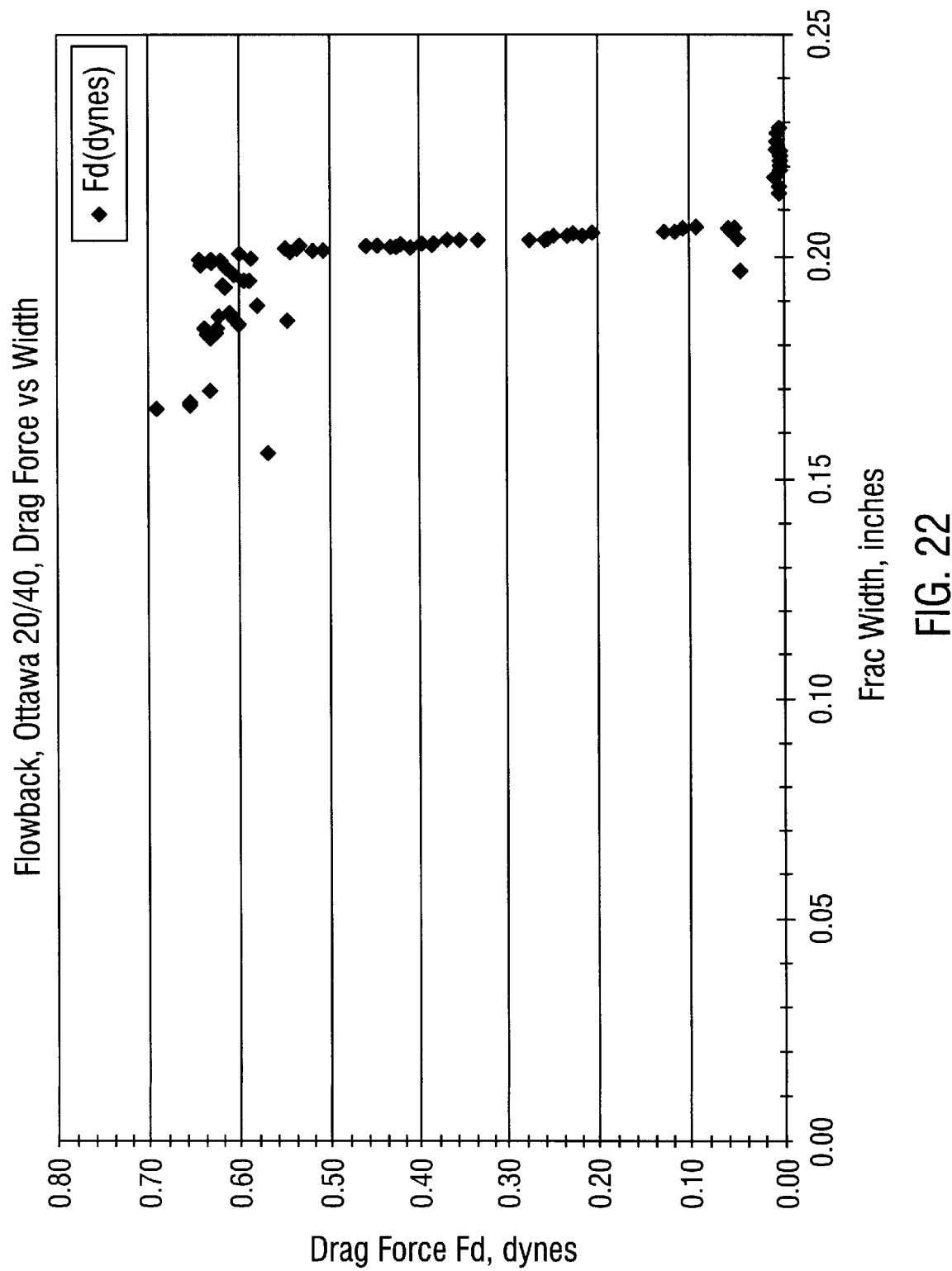
FIG. 22 illustrates drag force versus fracture width of a proppant pack containing 20/40 mesh Ottawa sand.
Figure 23:
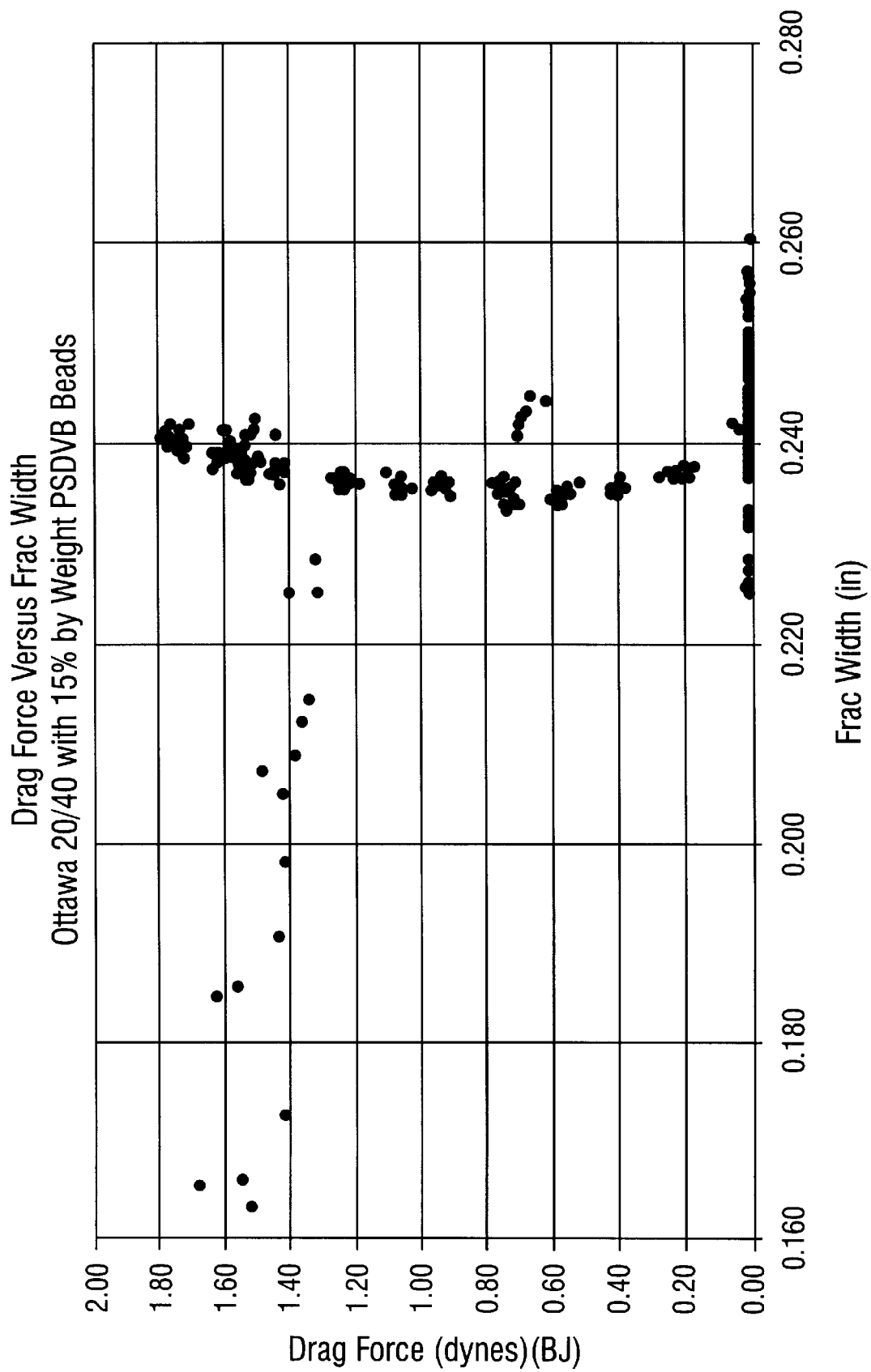
FIG. 23 illustrates drag force versus fracture width for a proppant pack mixture containing 20/40 mesh Ottawa sand and 15% by weight of 20 mesh polystyrene divinyl benzene plastic beads.

FIGS. 22 and 23 represent resistance to flowback test data obtained at varying fracture widths for 20/40 mesh Ottawa sand and a mixture of 20/40 Ottawa sand with 15% by weight of 20 mesh polystyrene divinylbenzene beads containing 0.5% by weight divinylbenzene crosslinker, respectively. This data was generated under stepped flowrate conditions up to failure. As may be seen, the proppant mixture of Ottawa sand and polystyrene divinylbenzene beads exhibited a significantly higher Fd of about 1.3 to about 1.6 dynes as compared to Fd of the 20/40 Ottawa sand alone (about 0.60). Significantly, the Ottawa sand/ polystyrene divinylbenzene also maintained this greater flowback resistance up to a fracture width of about 0.235 inches as compared to a fracture width of about 0.205 inches for the Ottawa sand alone. This demonstrates the superior fracture pack stability provided by proppant pack mixtures containing the deformable particles of the present disclosure.

Figure 24:
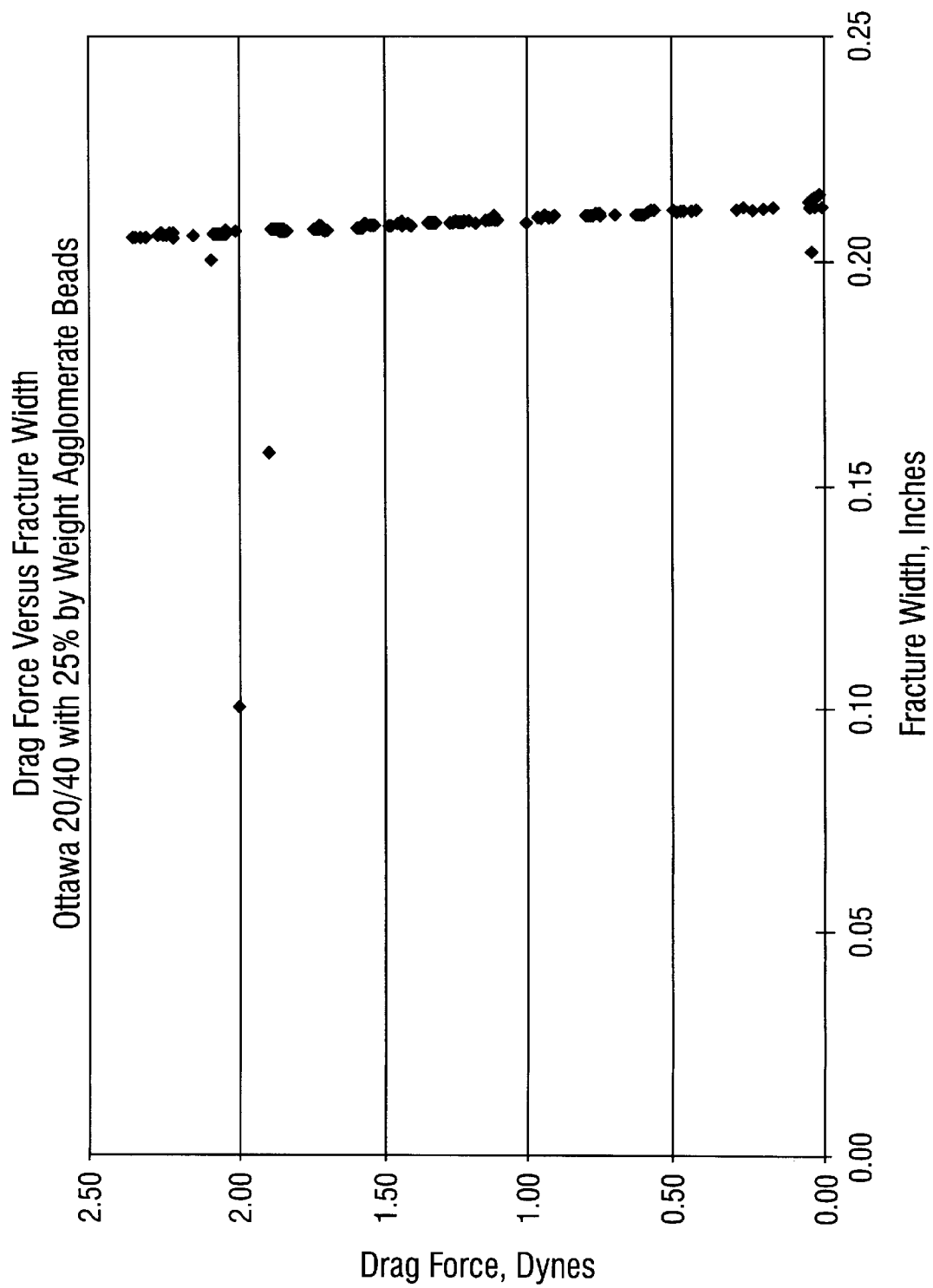
FIG. 24 illustrates drag force versus fracture width for a proppant pack mixture containing 20/40 mesh Ottawa sand and 30 mesh silica/resin agglomerate beads.

FIG. 24 represents resistance to flowback test data for a mixture of 20/40 Ottawa sand with 25% by weight of 30 mesh agglomerate beads containing approximately 90% 6 micron silica and 10% phenolic resin. This data was generated under stepped flowback conditions up to failure. As may be seen the combination of agglomerate beads and Ottawa sand generated even more resistance to proppant flowback than the Ottawa sand/polystyrene divinyl benzene mixture of FIG. 23. In other embodiments the phenolic resin may include a plasticizer to make the deformable layer more elastic.

Example 9

Cyclic Stress Tests

Conductivity measurements were made under conditions of cyclic stress on 20/40 mesh Ottawa sand and a mixture containing 20/40 mesh Ottawa sand and 15% polystyrene divinyl benzene beads by weight of total proppant mixture. The polystyrene divinyl benzene beads employed in the mixture contained about 0.5% divinyl benzene crosslinker by weight and had a size of about 20 mesh.

The tests of this example were performed at a temperature of 150° F. using the procedure of Example 4, with the exception that measurements were made under conditions of cyclic rather than static stress. Stress was increased from 2000 psi to 4000 psi and held at 4000 psi for one hour. The stress was then decreased to 2000 psi and held for one hour before repeating the cycle several times.

Figure 26:
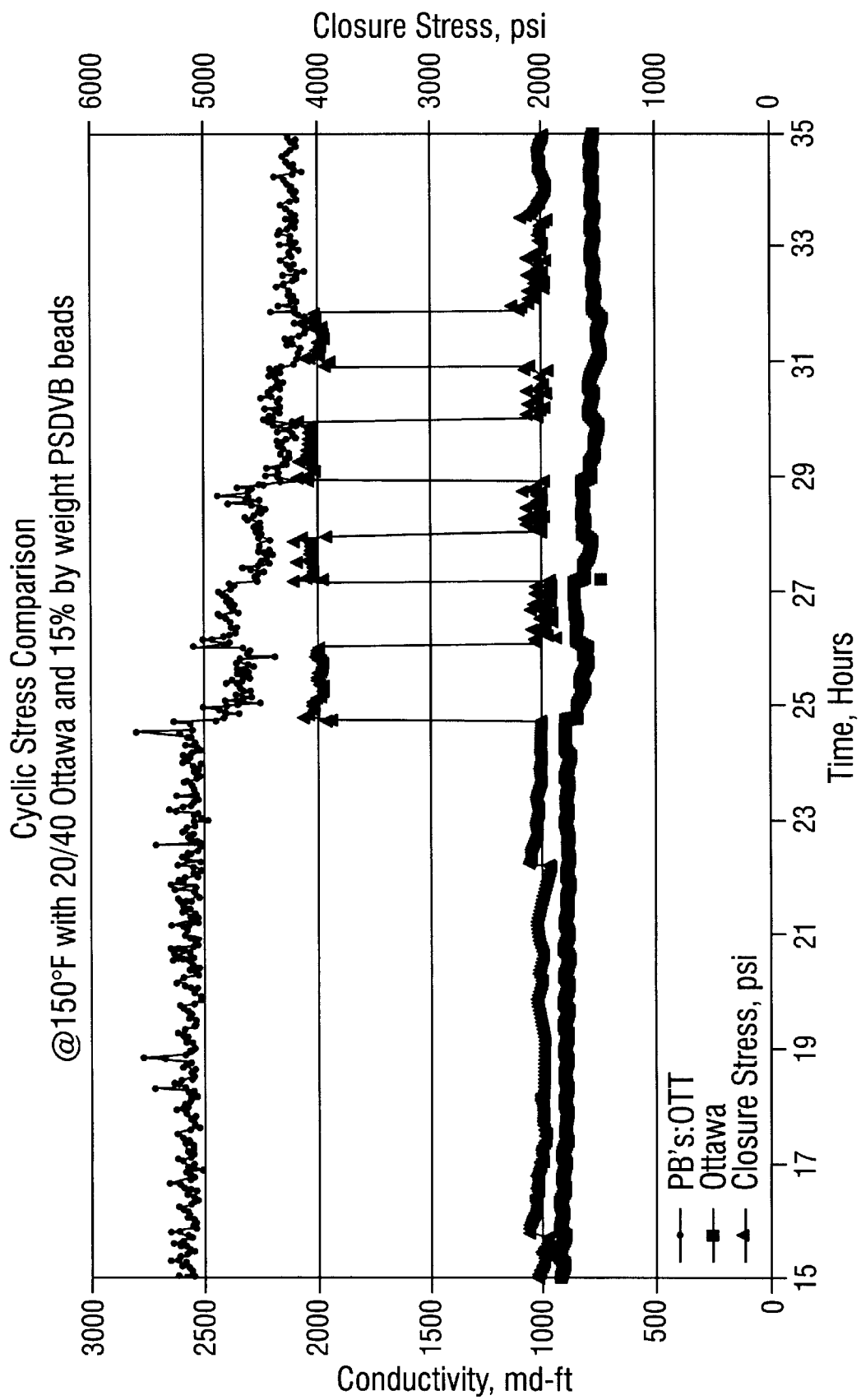
FIG. 26 illustrates conductivity as a function of a closure stress for 20/40 mesh Ottawa sand and a mixture containing 20/40 Ottawa sand and 15% by weight 20 mesh polystyrene divinylbenzene plastic beads.

As can be seen in FIG. 26, at a closure stress of about 2000 psi, conductivity of the 20/40 mesh Ottawa sand was about 900 millidarcy-feet ("md-ft") compared to a conductivity of about 2600 md-ft for the mixture of 20/40 Ottawa sand and polystyrene divinyl benzene beads. During closure stress cycling up to 4000 psi, the conductivity of the 20/40 mesh Ottawa sand dropped from about 900 md-ft to about 750 md-ft. In comparison, the conductivity of the 20/40 mesh Ottawa sand and polystyrene divinyl benzene bead mixture dropped from about 2600 md-ft to about 2200 md-ft. Results of this example indicate that the sand and polystyrene divinyl benzene bead mixture retains superior conductivity during and after stress cycling when compared to 20/40 mesh Ottawa sand alone.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims.

What is claimed is:

1. A method of treating a subterranean formation, comprising:

injecting a fracturing fluid composition into said subterranean formation, wherein said fracturing fluid composition comprises a blend of a fracture proppant material and a deformable beaded material, wherein in said formation individual particles of said deformable beaded material yield upon point to point stress with particles of said fracture proppant material.

2. The method of claim 1, wherein said deformable beaded material is a copolymer.

3. The method of claim 2, wherein said copolymer is a terpolymer.

4. The method of claim 3, wherein said terpolymer is at least one of polystyrene/vinyl/divinyl benzene, acrylate-based terpolymer or a mixture thereof.

5. The method of claim 2, wherein said deformable beaded material comprises polystyrene divinylbenzene.

6. The method of claim 5, wherein the polystyrene divinylbenzene comprises from about 0.3% to about 55% divinylbenzene by weight.

7. The method of claim 5, wherein the polystyrene divinylbenzene comprises from about 0.5% to about 20% divinylbenzene by weight.

8. The method of claim 5, wherein the polystyrene divinylbenzene comprises from about 4% to about 14% divinylbenzene by weight.

9. The method of claim 1, wherein at least a portion of the individual particles of said deformable beaded material comprise multiple components.

10. The method of claim 9, wherein at least a portion of said individual particles of said deformable beaded material comprise a core of substantially non-deformable material surrounded by at least one layer of substantially deformable material.

11. The method of claim 10, wherein said core comprises a material selected from at least one of silica, ceramics, synthetic organic particles, glass microspheres, or a mixture thereof; and wherein said layer of substantially deformable material comprises at least one of a cross-linked polymer, plastic, or a mixture thereof.

12. The method of claim 10, wherein said core comprises a material selected from at least one of silica, ceramics, synthetic organic particles, glass microspheres, or a mixture thereof; wherein said layer of substantially deformable material comprises resin; and wherein said layer of substantially deformable material comprises greater than 8% by weight of the total weight of said deformable beaded particle.

13. The method of claim 12, wherein said layer of substantially deformable material comprises greater than about 10% by weight of the total weight of said deformable beaded particle.

14. The method of claim 10, wherein said layer of substantially deformable material comprises between about 20% and about 90% by volume of the total volume of each of said individual particles of said deformable beaded material.

15. The method of claim 1, wherein at least a portion of said individual particles of said deformable beaded material comprise an agglomerate of substantially non-deformable material and substantially deformable material.

16. The method of claim 15, wherein said agglomerate comprises substantially non-deformable material particles that are less than about 100 microns in size and wherein said substantially deformable material encapsulates said substantially non-deformable material particles.

17. The method of claim 16, wherein said substantially non-deformable material particles are about 6 microns in size.

18. The method of claim 15, wherein said substantially non-deformable material comprises at least one of silica, cristobalite, graphite, gypsum, talc, or a mixture thereof; and wherein said substantially deformable material comprises at least one of furan, furfuryl, phenol formaldehyde, phenolic epoxy, or a mixture thereof.

19. The method of claim 15, wherein said substantially deformable material comprises between about 5% and about 50% by volume of the total volume of each of said individual particles of said deformable beaded material; and wherein said substantially non-deformable material comprises between about 50% and about 95% by volume of the total volume of each of said individual particles of said deformable beaded material.

20. The method of claim 1, wherein said deformable beaded material acts to prevent grain to grain contact and to absorb stress between particles of said fracture proppant.

21. The method of claim 1, wherein a fracture pack comprising said deformable beaded material and said fracture proppant material is formed in said subterranean formation, and wherein said deformable beaded material deforms in situ to create multi-planar structures with said fracture proppant material in said proppant pack.

22. The method of claim 1, wherein said fracture proppant material comprises sand, and wherein said deformable beaded material comprises polystyrene divinylbenzene.

23. A method of treating a subterranean formation, comprising:
    injecting a blend comprising a fracture proppant material and a deformable particulate material into a subterranean formation, wherein at least a portion of the individual particles of said deformable particulate have a shape with a maximum length-based aspect ratio of equal to or less than about 5; wherein within said formation, individual particles of said deformable particulate material yield upon point to point stress with particles of said fracture proppant material.

24. The method of claim 23, wherein said deformable particulate material has a Young's modulus of between about 500 psi and about 2,000,000 psi at in situ formation conditions.

25. The method of claim 23, wherein said deformable particulate material has a Young's modulus of between about 5000 psi and about 200,000 psi at in situ formation conditions.

26. The method of claim 23, wherein said deformable particulate material has a Young's modulus of between about 7000 psi and about 150,000 psi at in situ formation conditions.

27. The method of claim 23, wherein said deformable particulate material comprises a copolymer.

28. The method of claim 27, wherein said copolymer is a terpolymer.

29. The method of claim 28, wherein said terpolymer is at least one of polystyrene/vinyl/divinyl benzene, acrylate-based terpolymer or a mixture thereof.

30. The method of claim 23, wherein said deformable particulate material comprises polystyrene divinylbenzene.

31. The method of claim 30, wherein said polystyrene divinylbenzene comprises from about 0.3% to about 55% divinylbenzene by weight.

32. The method of claim 30, wherein said polystyrene divinylbenzene comprises from about 0.5% to about 20% divinylbenzene by weight.

33. The method of claim 30, wherein said polystyrene divinylbenzene comprises from about 4% to about 14% divinylbenzene by weight.

34. The method of claim 23, wherein said blend comprises between from about 1% to about 50% by weight deformable particulate material.

35. The method of claim 23, wherein at least a portion of the individual particles of said deformable particulate material comprise multiple components.

36. The method of claim 35, wherein at least a portion of said individual particles of said deformable particulate material comprise a core of substantially non-deformable material surrounded by a layer of substantially deformable material.

37. The method of claim 36, wherein said core comprises a material selected from at least one of silica, ceramics, synthetic organic particles, glass microspheres, or a mixture thereof; and wherein said layer of substantially deformable material comprises at least one of a cross-linked polymer, plastic, or a mixture thereof.

38. The method of claim 37, wherein said layer of substantially deformable material comprises between about 20% and about 90% by volume of the total volume of each of said individual particles of said deformable particulate material.

39. The method of claim 36, wherein said layer of substantially deformable material comprises greater than 8% by weight of the total weight of each individual particle of said deformable particulate material.

40. The method of claim 36, wherein said layer of substantially deformable material comprises greater than about 10% by weight of the total weight of each individual particle of said deformable particulate material.

41. The method of claim 23, wherein at least a portion of said individual particles of said deformable particulate material comprise an agglomerate of substantially non-deformable material and substantially deformable material.

42. The method of claim 41, wherein said agglomerate comprises substantially non-deformable material particles that are less than about 100 microns in size and wherein said substantially deformable material encapsulates said substantially non-deformable material particles.

43. The method of claim 42, wherein said substantially deformable material comprises between about 5% and about 50% by volume of the total volume of each of said individual particles of said deformable beaded material; and wherein said substantially non-deformable material comprises between about 50% and about 95% by volume of the total volume of each of said individual particles of said deformable beaded material.

44. The method of claim 42, wherein said substantially non-deformable material particles are about 6 microns in size.

45. The method of claim 41, wherein said substantially non-deformable material comprises at least one of silica, cristobalite, graphite, gypsum, talc, or a mixture thereof; and wherein said substantially deformable material comprises at least one of furan, phenol formaldehyde, phenolic epoxy, or a mixture thereof.

46. The method of claim 41, wherein said substantially nondeformable material is silica.

47. The method of claim 41, wherein said substantially nondeformable material is silica, and wherein said substantially deformable material is phenolic resin.

48. The method of claim 23, wherein said deformable particulate material has a particle size of from about 4 mesh to about 100 mesh, and a specific gravity of from about 0.8 to about 3.5.

49. The method of claim 23, wherein individual particles of said deformable particulate material each comprise at least one of a polymer, a crosslinked polymer, a metal, an agglomerate particle, a multi-layered particle or a mixture thereof; and wherein said fracture proppant material comprises at least one of silica, resin-coated sand, ceramic particles, synthetic organic particles, glass microspheres, sintered bauxite, or a mixture thereof.

50. The method of claim 49, wherein said fracture proppant material has a particle size of from about 4 mesh to about 100 mesh, and wherein the ratio of said fracture proppant material to said deformable particulate material is from about 1:1 to about 15:1 by volume.

51. The method of claim 50, wherein said fracture proppant material comprises sand, and wherein said deformable particulate material comprises polystyrene divinylbenzene.

52. The method of claim 25, wherein said deformable particulate material acts to prevent grain to grain contact and to absorb stress between particles of said fracture proppant.

53. The method of claim 23, wherein a fracture pack comprising said deformable particulate material and said fracture proppant material is formed in said subterranean formation, and wherein said deformable particulate material deforms in situ to create multi-planar structures with said fracture proppant material in said proppant pack.

54. The method of claim 25, wherein said fracture proppant material comprises sand, and said deformable particulate material comprises polystyrene divinylbenzene.

55. A method of treating a subterranean formation, comprising:
injecting a blend comprising deformable particles and fracture proppant particles into a subterranean formation, wherein at least a portion of individual particles of said deformable particles each comprises substantially non-deformable material and substantially deformable material components.

56. The method of claim 55, wherein said deformable particulate material has a Young's modulus of between about 500 psi and about 2,000,000 psi at in situ formation conditions.

57. The method of claim 55, wherein said deformable particulate material has a Young's modulus of between about 5000 psi and about 200,000 psi at in situ formation conditions.

58. The method of claim 55, wherein said deformable particulate material has a Young's modulus of between about 7000 psi and about 150,000 psi at in situ formation conditions.

59. The method of claim 55, wherein at least a portion of said individual particles of said deformable particles comprise a core component of substantially non-deformable material surrounded by at least one layer component of substantially deformable material.

60. The method of claim 59, wherein said core component comprises a material selected from at least one of silica, ceramics, synthetic organic particles, glass microspheres, or a mixture thereof; and wherein said layer component of substantially deformable material comprises at least one of a cross-linked polymer, plastic, or a mixture thereof.

61. The method of claim 59, wherein said layer component of substantially deformable material comprises between about 20% and about 90% by volume of the total volume of each of said individual particles of said deformable particles.

62. The method of claim 55, wherein at least a portion of said individual particles of said deformable particles comprise an agglomerate of a plurality of substantially non-deformable material components intermixed with substantially deformable material.

63. The method of claim 62, wherein said substantially non-deformable material comprises at least one of silica, cristobalite, graphite, gypsum, talc, or a mixture thereof; and wherein said substantially deformable material comprises at least one of furan, phenol formaldehyde, phenolic epoxy, or a mixture thereof.

64. The method of claim 63, wherein said agglomerate comprises substantially nondeformable material components having a size of less than about 100 microns intermixed with substantially deformable material.

65. The method of claim 63, wherein said substantially nondeformable material components comprise silica, and wherein said substantially deformable material comprises phenolic resin.

66. The method of claim 65, wherein said silica components have a size of from about 6 microns to about 100 microns.

67. The method of claim 65, wherein said silica comprises particles having a size of about 6 microns.

68. The method of claim 62, wherein said substantially deformable material comprises between about 5% and about 50% by volume of the total volume of each of said individual particles of said agglomerated deformable particles; and wherein said substantially non-deformable material components comprises between about 50% and about 95% by volume of the total volume of each of said individual particles of said agglomerated deformable particles.

69. The method of claim 68, wherein said substantially nondeformable material components comprise silica, and wherein said substantially deformable material comprises phenolic resin.

70. The method of claim 69, wherein said silica components have a size of from about 6 microns to about 100 microns.

71. The method of claim 70, wherein said silica comprises particles having a size of about 6 microns.

72. The method of claim 69, wherein said silica comprises particles having a size of from about 6 microns to about 100 microns intermixed with said phenolic epoxy resin.

73. The method of claim 62, wherein said agglomerate comprises substantially nondeformable material components having a size of less than about 100 microns intermixed with substantially deformable material.

74. The method of claim 55 wherein at least a portion of said individual particles of said deformable particles each has a shape that is at least one of beaded, cubic, cylindrical, bar-shaped, multi-faceted, irregular, tapered, or a mixture thereof;

wherein each of said beaded and cylindrical shaped particles has a length and a diameter, and wherein each of said bar-shaped particles has a length, a width, and a thickness, and wherein each of said multi-faceted, irregular, and tapered particles has a length; and wherein said beaded shaped particles have a length to diameter aspect ratio of equal to or less than about 5, wherein said cylindrical shaped particles have a length to diameter aspect ratio of equal to or less than about 5, wherein said multi-faceted, irregular, tapered particles have a maximum length-based aspect ratio of equal to or less than about 5, and wherein said bar-shaped particles has a length to width aspect ratio of equal to or less than about 5 and a length to thickness aspect ratio of equal to or less than about 5.

75. The method of claim 55, wherein at least a portion of said individual particles of said deformable particles have a beaded shape.

76. The method of claim 55, wherein at least a portion of the individual particles of said deformable particles have a shape that is substantially spherical.

77. The method of claim 55, wherein at least a portion of the individual particles of said deformable particles have a shape with a maximum length-based aspect ratio of equal to or less than about 5.

78. The method of claim 55, wherein said fracture proppant particles comprise sand.

79. The method of claim 55, wherein said fracture proppant particles have a particle size of from about 4 mesh to about 100 mesh, and wherein said deformable particles have a particle size of from about 4 mesh to about 100 mesh.

80. The method of claim 55, wherein a ratio of said fracture proppant particles to said deformable particles in said blend is from about 1:1 to about 15:1 by volume.

81. The method of claim 55, wherein said deformable particulate material acts to prevent grain to grain contact and to absorb stress between particles of said fracture proppant.

82. The method of claim 55, wherein a fracture pack comprising said deformable particulate material and said fracture proppant material is formed in said subterranean formation, and wherein said deformable particulate material deforms in situ to create multi-planar structures with said fracture proppant material in said proppant pack.

83. The method of claim 55, wherein said layer of substantially deformable material comprises greater than 8% by weight of the total weight of each individual particle of said deformable particulate material.

84. The method of claim 55, wherein said layer of substantially deformable material comprises greater than about 10% by weight of the total weight of each individual particle of said deformable particulate material.

85. A method of treating a subterranean formation, comprising the steps of:

injecting a fracturing fluid composition into said subterranean formation, wherein said fracturing fluid composition comprises a blend of fracture proppant material and substantially deformable particulate material; and depositing said fracturing fluid composition in said subterranean formation, wherein an in situ conductivity of said blend of fracture proppant material and substantially deformable particulate material is greater than an in situ conductivity of either one of said fracture proppant material or substantially deformable particulate material alone.

86. The method of claim 85, wherein individual particles of said deformable particulate material each comprise at least one of a polymer, a crosslinked polymer, a metal, or a mixture thereof; and wherein said fracture proppant material comprises at least one of silica, resin-coated sand, ceramic particles, synthetic organic particles, glass microspheres, sintered bauxite, or a mixture thereof.

87. The method of claim 85, wherein said deformable particulate material comprises polystyrene divinylbenzene.

88. The method of claim 85, wherein said deformable particulate material acts to prevent grain to grain contact and to absorb stress between particles of said fracture proppant.

89. The method of claim 85, wherein a fracture pack comprising said deformable particulate material and said fracture proppant material is formed in said subterranean formation, and wherein said deformable particulate material deforms in situ to create multi-planar structures with said fracture proppant material in said proppant pack.

90. The method of claim 85, wherein at least a portion of said individual particles of said deformable particulate material comprise an agglomerate of substantially non-deformable material and substantially deformable material, a core of substantially non-deformable material surrounded by at least one layer of substantially deformable material, or a mixture thereof.

91. A method of treating a subterranean formation, comprising the steps of:

injecting a fracturing fluid composition into said subterranean formation, wherein said fracturing fluid composition comprises a blend of fracture proppant material and deformable particulate material; and depositing said fracturing fluid composition in said subterranean formation, wherein an in situ creation of fines in said blend of fracture proppant material and deformable particulate material is less than an in situ creation of fines in said fracture proppant material alone.

92. The method of claim 91, wherein said deformable particulate material acts to prevent grain to grain contact and to absorb stress between particles of said fracture proppant.

93. The method of claim 57, wherein a fracture pack comprising said deformable particulate material and said fracture proppant material is formed in said subterranean formation, and wherein said deformable particulate material deforms in situ to create multi-planar structures with said fracture proppant material in said proppant pack.

94. The method of claim 91, wherein at least a portion of said individual particles of said deformable particulate material comprise an agglomerate of substantially non-deformable material and substantially deformable material, a core of substantially non-deformable material surrounded by at least one layer of substantially deformable material, or a mixture thereof.

95. A composition for fracturing a subterranean formation, said composition comprising a blend of deformable particulate material and fracture proppant material, wherein at least a portion of individual particles of said deformable particulate material each comprises multiple components.

96. The composition of claim 95, wherein said individual particles of said deformable particulate material each comprises an agglomerate of a plurality of substantially non-deformable material components intermixed with substantially deformable material.

97. The composition of claim 95, wherein at least a portion of said individual particles of said deformable particulate material each comprises a core component of substantially non-deformable material surrounded by at least one layer component of substantially deformable material.

98. A method of treating a subterranean formation, comprising:
- injecting a blend comprising a deformable beaded material and fracture proppant material into a subterranean formation, wherein at least a portion of individual particles of said deformable beaded material each comprises an agglomerate of a plurality of substantially non-deformable material components intermixed with substantially deformable material;
- wherein said substantially deformable material comprises between about 5% and about 50% by volume of the total volume of each of said individual agglomerate particles; and wherein said plurality of substantially non-deformable material components comprises between about 50% and about 95% by volume of the total volume of each of said individual agglomerate particles;
- wherein said plurality of substantially non-deformable material components comprises silica particles having a size of from about 6 microns to about 100 microns and wherein said substantially deformable material comprises phenolic resin;
- wherein said fracture proppant material comprises at least one of silica, resin-coated sand, ceramic particles, synthetic organic particles, glass microspheres, sintered bauxite, or a mixture thereof;
- wherein said fracture proppant material has a particle size of from about 4 mesh to about 100 mesh, and wherein said deformable particulate material has a particle size of from about 4 mesh to about 100 mesh; and
- wherein a ratio of said fracture proppant material to said deformable particulate material in said blend is from about 1:1 to about 15:1 by volume.

99. A method of treating a subterranean formation, comprising the step of:
- injecting a fracturing fluid composition into said subterranean formation, wherein said fracturing fluid composition comprises a blend of a fracture proppant material and a deformable beaded material.

100. The method of claim 99, wherein said deformable beaded material has a Young's modulus of between about 5000 psi and about 500,000 psi at in situ formation conditions.

101. The method of claim 100, wherein said deformable beaded material comprises polystyrene divinylbenzene.

102. The method of claim 99, wherein no sticking or adherence occurs between said deformable beaded material and said fracture proppant material.

103. A method of treating a subterranean formation, comprising the step of:
- injecting a blend comprising a fracture proppant material and a deformable particulate material into a subterranean formation, wherein individual particles of said deformable particulate have a shape with a maximum length-based aspect ratio of equal to or less than about 5.

104. A method of treating a subterranean formation, comprising the step of:
- injecting a blend comprising a fracture proppant material and a deformable particulate material into a subterranean formation, said deformable particulate material having a shape that is at least one of beaded, cubic, cylindrical, bar-shaped, multi-faceted, irregular, tapered, or a mixture thereof;
- wherein each of said beaded and cylindrical shaped particulate materials has a length and a diameter, wherein each of said bar-shaped particulate materials has a length, a width, and a thickness, and wherein each of said multi-faceted, irregular, and tapered particulate materials has a length; and
- wherein said beaded shaped particulate materials have a length to diameter aspect ratio of equal to or less than about 5, wherein said cylindrical shaped particulate materials have a length to diameter aspect ratio of equal to or less than about 5, wherein said multi-faceted, irregular, and tapered particulate materials have a maximum length-based aspect ratio of equal to or less than about 5, and wherein said bar-shaped particulate material has a length to width aspect ratio of equal to or less than about 5 and a length to thickness aspect ratio of equal to or less than about 5.

105. The method of claim 104, wherein said fracture proppant material comprises sand, and wherein said deformable particulate material comprises polystyrene divinylbenzene.

* * * * *

UNITED STATES PATENT AND TRADEMARK OFFICE
CERTIFICATE OF CORRECTION

PATENT NO. : 6,059,034  
DATED : May 9, 2000  
INVENTOR(S) : Rickards et al.

Page 1 of 1

It is certified that error appears in the above-identified patent and that said Letters Patent is hereby corrected as shown below:

<u>Column 1,</u>  
Line 6, delete "a continuation-in-part" and insert -- claims priority on --

Signed and Sealed this

Fifth Day of February, 2002

Attest:

JAMES E. ROGAN  
*Attesting Officer*     *Director of the United States Patent and Trademark Office*